United States Patent
Cho et al.

(10) Patent No.: US 9,944,855 B2
(45) Date of Patent: Apr. 17, 2018

(54) SOIL STABILIZATION AND IMPROVEMENT METHOD USING BIOPOLYMER

(71) Applicants: KOREA ADVANCED INSTITUTE OF SCIENCE AND TECHNOLOGY, Daejeon (KR); KOREA INSTITUTE OF CONSTRUCTION TECHNOLOGY, Goyang-si, Gyeonggi-do (KR)

(72) Inventors: Gye Chun Cho, Daejeon (KR); Il Han Chang, Goyang-si (KR)

(73) Assignees: KOREA ADVANCED INSTITUTE OF SCIENCE AND TECHNOLOGY, Daejeon (KR); KOREA INSTITUTE OF CONSTRUCTION TECHNOLOGY, Goyang-si, Gyeonggi-do (KR)

(*) Notice: Subject to any disclaimer, the term of this patent is extended or adjusted under 35 U.S.C. 154(b) by 307 days.

(21) Appl. No.: 14/434,188

(22) PCT Filed: Jul. 31, 2013

(86) PCT No.: PCT/KR2013/006906
§ 371 (c)(1),
(2) Date: Apr. 8, 2015

(87) PCT Pub. No.: WO2014/058145
PCT Pub. Date: Apr. 17, 2014

(65) Prior Publication Data
US 2015/0275085 A1    Oct. 1, 2015

(30) Foreign Application Priority Data

Oct. 9, 2012  (KR) .................. 10-2012-0112059
Oct. 9, 2012  (KR) .................. 10-2012-0112060
Jul. 31, 2013  (KR) .................. 10-2013-0090883
Jul. 31, 2013  (KR) .................. 10-2013-0090894

(51) Int. Cl.
*C09K 17/00*  (2006.01)
*C09K 17/32*  (2006.01)
*E02D 17/20*  (2006.01)

(52) U.S. Cl.
CPC ............. *C09K 17/32* (2013.01); *E02D 17/20* (2013.01)

(58) Field of Classification Search
CPC .................................. E02D 3/12; C09K 17/32
See application file for complete search history.

(56) References Cited

U.S. PATENT DOCUMENTS 3,640,698 A * 2/1972 Backlund .................. C05B 7/00
                                                                  504/327
3,867,250 A   2/1975 Jankowiak et al.
(Continued)

FOREIGN PATENT DOCUMENTS

CN    101099491 A    1/2008
CN    101691490 A    4/2010
(Continued)

OTHER PUBLICATIONS

International Search Report from International Application No. PCT/KR2013/006906 dated Oct. 22, 2013.
(Continued)

*Primary Examiner* — John J Kreck
(74) *Attorney, Agent, or Firm* — Brundidge & Stanger, P.C.

(57) ABSTRACT

The present disclosure described herein pertain generally to a method for stabilizing and improving a soil by using a high-molecular viscous biopolymer, a soil composition for promoting germination or growth of vegetation, a composition for preventing soil erosion, and a soil construction material and member.

12 Claims, 18 Drawing Sheets

(56) References Cited

U.S. PATENT DOCUMENTS

| | | | |
|---|---|---|---|
| 4,071,400 A | 1/1978 | Jankowiak | |
| 4,486,120 A | 12/1984 | Landry, Jr. | |
| 4,663,067 A | 5/1987 | Mallow et al. | |
| 5,860,770 A | 1/1999 | Hunt | |
| 7,407,993 B2 | 8/2008 | Harrison | |
| 2009/0242833 A1 | 10/2009 | Chen et al. | |
| 2011/0113983 A1* | 5/2011 | Bernu | C09K 17/50 106/15.05 |

FOREIGN PATENT DOCUMENTS

| | | | |
|---|---|---|---|
| CN | 102603417 A | 7/2012 | |
| JP | 10-513491 A | 12/1998 | |
| JP | 2010-275697 A | 12/2010 | |
| KR | 1020120059676 A | 6/2012 | |
| WO | WO 2012022164 A1 * | 2/2012 | C09K 17/52 |

OTHER PUBLICATIONS

Sylvain Norton et al., "Gellan gum gel as entrapment matrix for high temperature fermentation processes: a rheological study", Biotechnology Techniques, vol. 4, No. 5, pp. 351-356, Jul. 1990.

Yong Beom Choi et al., "Effects of Polyacrylamide and Biopolymer on Soil Erosion and Crop Productivity in Sloping Uplands: A Field Experiment", Journal of Korean Society of Environmental Engineers vol. 32, No. 11, Nov. 2010, pp. 1024-1029.

* cited by examiner

ARTIFICIAL CULTURE SOIL (BETA GLUCAN-TREATED, XANTHAN GUM-TREATED, AND UNTREATED SPECIMENS, FROM THE LEFT)

YELLOW SOIL (BETA GLUCAN-TREATED, XANTHAN GUM-TREATED, AND UNTREATED SPECIMENS, FROM THE LEFT)

SOIL STABILIZATION AND IMPROVEMENT METHOD USING BIOPOLYMER

TECHNICAL FIELD

The present disclosure described herein pertain generally to a method for stabilizing and improving a soil by using a high-molecular viscous biopolymer, a soil composition for promoting germination or growth of vegetation, a composition for preventing soil erosion, and a soil construction material and member.

BACKGROUND ART

A geotechnical composition of soils, strictly speaking, particle size distribution, a water content, and an organic matter content directly affect erosion of soils [Bissonnais, 1996, "Aggregate stability and assessment of soil crustability and erodibility: I. Theory and methodology," European Journal of Soil Science, Vol. 47, pages 425-437]. In present days, the erosion of soils is being considered a serious environment problem because the soil erosion has a direct and indirect effect on desertification and climate changes [Gisladottir and Stocking, 2005, "Land degradation control and its global environmental benefits," Land Degradation & Development, Vol. 16, pages 99-112]. ⅓ of the world's land is currently undergoing the desertification that accompanies the soil erosion, and the desertification is spreading, creating 12 million ha new deserts every year [UNEP (United Nations Environment Programme), 2006, "Deserts & Drylands," TUNZA the UNEP Magazine for Youth, Vol. 4, No. 1, pages 1-24]. Since the soil erosion causes decrease of productivity of farmlands as well as disturbance of the ecosystem [Gisladottir and Stocking, 2005, "Land degradation control and its global environmental benefits," Land Degradation & Development, Vol. 16, pages 99-112], development of technologies capable of reducing or suppressing the soil erosion has been urgently demanded.

Conventional methods of suppressing soil erosion have mostly suggested mounting meshes, nets or the like on a soil surface to block external factors (water or wind) causing the erosion [U.S. Pat. No. 3,867,250; U.S. Pat. No. 4,071,400; and U.S. Pat. No. 4,486,120]. However, the externally mounted structures have many limits since they have a time-limited performance and costs much. Accordingly, technologies intended to increase resistance against the erosion by improving soils have been recently suggested [U.S. Pat. No. 4,663,067; U.S. Pat. No. 5,860,770; and U.S. Pat. No. 7,407,993]. However, since the technologies depend on a method of grouting or spraying chemical products, they are irrelevant to the environment-friendly prospect. The soil erosion is primarily attributed to destruction of the ecosystem on a surface layer and an adverse effect of reckless development (slash and burn farming or grazing). Accordingly, the ecological environment should be restored to effectively suppress the soil erosion.

In addition, the geotechnical structure of soils has a direct effect on growth of vegetation. Generally, as the structure of soils is loose, and a water content of soils is high, growth of plants is improved [Passioura, 1991, "Soil structure and plant growth," Australian Journal of Soil Research, Vol. 28, No. 6, pages 717-728]. Accordingly, for farming, it is important to stir the farmland prior to sowing seeds, or maintain an effective irrigation system. Most of Korean surface soils are granitic residual soils, which are final weathering products of granite, and yellow soil is also a kind of the granitic residual soils [Jin-Yeon Hwang, et. al., 2000, "Composition minerals and chemical components of Korean yellow soil (weathered soils)," Journal of The Mineralogical Society of Korea, Vol. 13, No. 3, pages 146-163]. As yellow soil mainly consisting of halloysite has a dense soil structure, it has been used as a construction material from the past; however, it has been regarded as being inappropriate for vegetation growth.

Thus, there are increasing interests in research for improvement of soils to increase vegetation growth while suppressing the erosion of soils.

DISCLOSURE OF THE INVENTION

Problems to be Solved by the Invention

In view of the foregoing problems, the present application provides a method for stabilizing and improving a soil capable of improving vegetation growth while preventing erosion of a soil and enhancing strength and durability of a soil.

However, the problems sought to be solved by the present disclosure are not limited to the above description, and other problems can be clearly understood by those skilled in the art from the following description.

Means for Solving the Problems

In a first aspect of the present disclosure, a method for stabilizing and improving a soil, comprising adding a high-molecular viscous biopolymer into a soil is provided.

In a second aspect of example embodiments, a soil composition for promoting germination or growth of vegetation, which is produced by the method according to the first aspect and comprises a high-molecular viscous biopolymer is provided.

In a third aspect of example embodiments, a soil composition for preventing soil erosion, which is produced by the method according to the first aspect and comprises a high-molecular viscous biopolymer is provided.

In a fourth aspect of example embodiments, a soil construction material or member, which is produced by the method of the first aspect and comprises a high-molecular viscous biopolymer, is provided.

Effect of the Invention

The erosion of a soil is affected by water retained in soils, particle size distribution, a content of an organic matter, surface vegetation, and others. As learned from the fact that deserts undergoing serious soil erosion are vulnerable to all of these conditions, the nature of a soil itself should be improved, rather than blocking external factors, in order to improve resistance against soil erosion. To this end, an environment-friendly method capable of facilitating growth of vegetation in the future, simultaneously with maintaining water of a soil long and increasing binding strength (adhesion strength) of soil particles is demanded. Since conventional chemical treatment methods have primarily focused on merely enhancing soil strength, there is lack of consideration of constructing a vegetation environment for suppressing permanent erosion.

Thus, the present disclosure has achieved remarkable effects in suppression of medium- and long-term erosion and assurance of durability, in addition to initial stabilization of a soil, by adding a high-molecular viscous biopolymer to a soil.

In addition, the method for stabilizing and improving the soil of the example embodiments can simultaneously realize environment-friendly promotion of vegetation germination or growth without depending on nitrogen- or phosphorus-based chemical fertilizers or artificial culture soils, and physical stabilization of sowed soils until vegetation stabilization (sufficient root anchorage) is accomplished.

The method for stabilizing and improving the soil of the example embodiments has environment-friendly advantages since it maintains initial stabilization of the land and is free from concern of contamination or eutrophication of underground water or streams, and biopolymers are naturally biodegraded to be returned to original soils as time lapses. Accordingly, the method for stabilizing and improving the soil of the example embodiments is believed to be effectively used in the environment-friendly vegetation composition field, and furthermore, other various fields such as vegetation slope composition in a large-scale construction site, a greening project for a stream levee and a water space, initial stabilization of roads and railway slopes, large-scale farmland composition, and rooftop and urban farming.

In addition, the present disclosure provides the new use of the environment-friendly biopolymer by applying it to soil stabilization and improvement, so as to greatly contribute to actual commercialization of the biopolymer.

DETAILED DESCRIPTION

Figure 1:
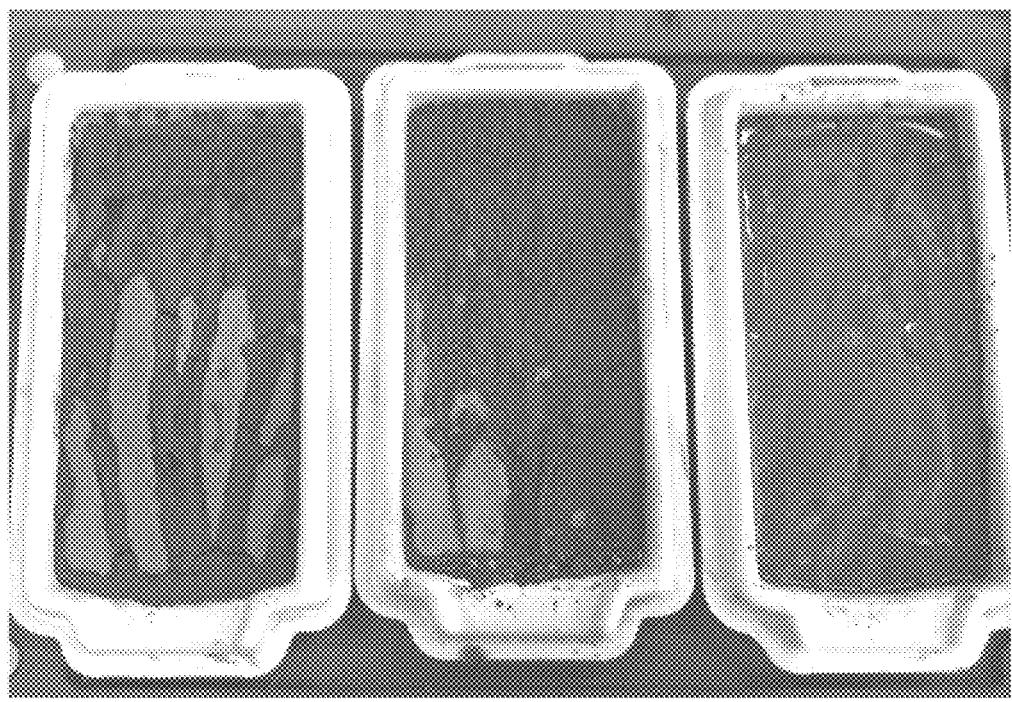
FIG. 1 shows an image of soil samples after one-time rainfall simulation in accordance with an example embodiment. The left, middle and right samples correspond to untreated yellow soil, xanthan gum-treated yellow soil, and beta-1,3/1,6-glucan-treated yellow soil, respectively.

Hereinafter, example embodiments and Examples of the present disclosure will be described in detail with reference to the accompanying drawings so that inventive concept may be readily implemented by those skilled in the art.

However, it is to be noted that the present disclosure is not limited to the example embodiments and the Examples but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element.

Throughout the whole document, the term "on" that is used to designate a position of one element with respect to another element includes both a case that the one element is adjacent to the another element and a case that any other element exists between these two elements.

Throughout the whole document, the term "comprises or includes" and/or "comprising or including" used in the document means that one or more other components, steps, operations, and/or the existence or addition of elements are not excluded in addition to the described components, steps, operations and/or elements.

Throughout the whole document, the terms "about or approximately" or "substantially" are intended to have meanings close to numerical values or ranges specified with an allowable error and intended to prevent accurate or absolute numerical values disclosed for understanding of the present invention from being illegally or unfairly used by any unconscionable third party. In addition, throughout the whole document, the term "step of" does not mean "step for."

Throughout the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Throughout the whole document, the description of "A and/or B" means "A or B, A and B."

Throughout the whole document, the term "cationic aqueous solution" means an aqueous solution containing a cation and may include, for example, but not be limited to, an aqueous solution containing an alkali metal or alkali earth metal ion. The alkali metal includes a Group 1 metal, which can provide a monovalent cation and consists of Li, Na, K, Rb and Cs, and the alkali earth metal includes a Group 2 metal, which can provide a divalent cation and consists of Be, Mg, Ca, Sr, Ba and Ra.

Throughout the whole document, the term "yellow soil" means a yellow or yellow-brown granitic residual soil formed from drifting fine grains of rocks crushed by weathering in the inside of the land.

Throughout the whole document, the term "soil" has the same meaning as earth.

Hereinafter, the example embodiments are described in detail, but the present disclosure may not be limited to the example embodiments.

The first aspect of the present disclosure provides a method for stabilizing and improving a soil, which includes adding a high-molecular viscous biopolymer to a soil.

In an example embodiment, any high-molecular material produced from an organism may be used as the high-molecular viscous biopolymer without limitation, but the high-molecular viscous biopolymer may not be limited thereto. The high-molecular viscous biopolymer may include a material having glucose as its basic unit (monomer), and be largely divided into a polysaccharide-based biopolymer and an amino acid-based biopolymer. The polysaccharide-based biopolymer may be divided into a high-molecular chain biopolymer and a high-molecular gelled biopolymer according to its shape. For example, the high-molecular chain biopolymer may include, but not be limited to, beta-1,3/1,6-glucan (Polycan™), alpha glucan, curdlan and others, and the gelled biopolymer may include, but not be limited to, wellan gum, gellan gum, xanthan gum, agar gum, succinoglycan gum and others. The amino acid-based biopolymer may include chitosan, γPGA and others, but not be limited thereto.

In an example embodiment, the high-molecular viscous biopolymer may be added in about 20 weight parts or less, for example, from about 0.00001 weight parts to about 15 weight parts, from about 0.00001 weight parts to about 10 weight parts, from about 0.00001 weight parts to about 5 weight parts, from about 0.00001 weight parts to about 1 weight part, from about 0.00001 weight parts to about 0.5 weight parts, from about 0.00001 weight parts to about 0.1 weight parts, from about 0.0001 weight parts to about 20 weight parts, from about 0.01 weight parts to about 20 weight parts, from 0.05 weight parts to about 20 weight parts, from about 0.1 weight parts to about 20 weight parts, from about 0.5 weight parts to about 20 weight parts, or from about 1 weight part to about 20 weight parts, from about 5 weight parts to about 20 weight parts, or from about 10 weight parts to about 20 weight parts, with respect to 100 weight parts of the soil, but the present disclosure may not be limited thereto.

In an example embodiment, the high-molecular viscous biopolymer may expand a pore within the soil, maintain the characteristic of water retention in the soil, and increase binding strength between soil particles, but not be limited thereto.

In an example embodiment, the addition of the high-molecular viscous biopolymer to the soils may be performed by mixing the high-molecular viscous biopolymer with the soil, spraying the high-molecular viscous biopolymer on a surface of the soil, or grouting the high-molecular viscous biopolymer into the soil, but not be limited thereto.

In an example embodiment, adding the high-molecular viscous biopolymer in the powder state to the soil may be included, but the present disclosure may not be limited thereto. The high-molecular viscous biopolymer may be directly mixed with the soil, a high-molecular viscous biopolymer powder, suspension or aqueous solution may be sprayed on the surface of the soil to form a cover, or the high-molecular viscous biopolymer may be grouted into the soil, but the present disclosure may not be limited thereto. In addition, the high-molecular viscous biopolymer may be directly mixed with the soil, and then, spread on a land surface of a target area, but the present disclosure may not be limited thereto.

In an example embodiment, adding the high-molecular viscous biopolymer in the aqueous solution or alkaline aqueous solution state to the soil may be included, but the present disclosure may not be limited thereto. For example, a suspension or aqueous solution of a high-molecular viscous gelled polysaccharide biopolymer may be added as it is, or salt may be added to the suspension or aqueous solution of the biopolymer to prepare an alkaline aqueous solution, e.g., the biopolymer in the alkaline aqueous solution state having pH about 9 or more and low viscosity, and the alkaline aqueous solution may be added to the soil, but the present disclosure may not be limited thereto. After the addition of the alkaline aqueous solution of the biopolymer to the soil, an acidic aqueous solution may be sprinkled to promote condensation of the permeating high-molecular viscous gelled polysaccharide biopolymer, but the present disclosure may not be limited thereto.

In an example embodiment, adding a cation of an alkali metal or an alkali earth metal after the addition of the high-molecular viscous biopolymer to the soil may be further included, but the present disclosure may not be limited thereto. For example, a cation of an alkali metal such as $Na^+$ and $K^+$ or a cation of an alkali earth metal such as $Ca^{2+}$ and Me may be added to cause gelation of the biopolymer and compose a rigid soil-biopolymer mixture, but the present disclosure may not be limited thereto.

In an example embodiment, adding an acidic aqueous solution with pH about 5 or less or a cationic aqueous solution after the addition of the high-molecular viscous biopolymer to the soil may be further included, but the present disclosure may not be limited thereto. The cationic aqueous solution may include, for example, an aqueous solution containing an alkali metal or alkali earth metal ion.

Since the surface of the biopolymer used in the method for stabilizing and improving the soil of the example embodiments has a negative charge, the characteristic of binding with the soil may be further improved when an alkali metal or alkali earth metal ion is added after the addition of the biopolymer to the soil.

In an example embodiment, heating and cooling the soil after the addition of the high-molecular viscous biopolymer to the soil may be further included, but the present disclosure may not be limited thereto. For example, after the addition of the high-molecular viscous biopolymer to the soil, the soil may be sufficiently heated at about 80° C. to about 120° C., and then, cooled to about 40° C. to about 60° C. or less so as to induce gelation of the biopolymer, but the present disclosure may not be limited thereto. In addition, adding a cation of an alkali metal or an alkali earth metal, e.g., a cation of an alkali metal such as $Na^+$ and $K^+$ or a cation of an alkali earth metal such as $Ca^{2+}$ and $Mg^{2+}$, after the cooling may be further included, but the present disclosure may not be limited thereto.

In an example embodiment, sprinkling water, an acidic aqueous solution, and/or a cationic aqueous solution, after the spraying of the high-molecular viscous biopolymer on the surface of the soil, may be further included, but the present disclosure may not be limited thereto. For example, an acidic aqueous solution with pH about 5 or less may be sprinkled to enhance the gel structure of the biopolymer within the soil, but the present disclosure may not be limited thereto.

In an example embodiment, the method for stabilizing and improving the soil may promote germination or growth of vegetation, but not be limited thereto.

In an example embodiment, the method for stabilizing and improving the soil may promote soil erosion resistance, but not be limited thereto.

In an example embodiment, the high-molecular viscous biopolymer may be added to the soil by various methods as described below depending on types and use purposes of the high-molecular viscous biopolymer to be used, but not be limited thereto:

1. Method for Promoting Soil Erosion Resistance by Using the High-Molecular Viscous Chain Polysaccharide High-molecular viscous chain polysaccharide biopolymers are generally polymers having a molecular weight of about 10,000 Da or more and exhibit high viscosity in the suspension or aqueous solution state because the chains (fibers) are tangled with one another. This high-molecular viscous chain polysaccharide tends to be easily bound to soil particles, especially, clayey soil particles due to its surface with an electrical property. Based on this interactive behavior, it is possible to promote strength of a soil and resistance against erosion by using the high-molecular viscous chain polysaccharide. The method for promoting soil erosion resistance by using the high-molecular viscous chain polysaccharide in accordance with the present disclosure is described below:

1) Surface Treatment Through Spraying

This method comprises spraying a high-molecular viscous chain polysaccharide in the powder state on a soil surface, and then, sprinkling water thereon to induce permeation into the soil, and simultaneously, causing expansion and tangling of the high-molecular viscous chain polysaccharide having high hydrophilicity, so as to form a biopolymer film over the whole soil surface.

This method comprises dissolving the high-molecular viscous chain polysaccharide in water and sprinkling the polysaccharide in the suspension or aqueous solution state having a concentration of from about 0.00001% to about 10% on the soil surface; in which the viscosity is adjusted by changing the concentration of the suspension or aqueous solution depending on a type of the soil so as to facilitate the permeation into the land, the suspension or aqueous solution is bound to the soil immediately upon the permeation so as to form a soil-biopolymer matrix, and the strength of the soil can increase as the water is dried.

2) Surface Layer Mixture Treatment

This method comprises mixing a soil and the high-molecular viscous chain polysaccharide with each other in advance, and then, pouring the mixture onto a surface to form a pack or cover; that is, mixing an in-situ or transported soil with a biopolymer and water to make a soil mixture, and then, pouring the soil mixture onto the site; specifically, the soil mixture is composed by adding the biopolymer at a ratio of about 0.0001% to about 5% with respect to a dry weight of the soil, and water at a ratio of about 10% to about 200% with respect to a weight of soils depending on a type of the soil (sand or clay), and then, poured on the site to reach a desired thickness. According to occasions, a process for compacting the poured cover may be additionally carried out.

In order to stir a surface of an in-situ soil, and simultaneously, mix the soil with the biopolymer, in which the soil is stirred by equipment like a plough or an auger, and simultaneously, the biopolymer in the powder or liquid state is sprayed thereon or grouted thereinto so as to compose a soil-biopolymer mixture soil.

3) Method Using a Pressure

For a slope, which cannot be subject to the surface layer treatment using spraying or pre-mixing, this method comprises spraying a high-molecular viscous chain polysaccharide suspension or aqueous solution in a concentration of from about 0.00001% to about 10% at a high pressure to promote both stirring of a soil of the slope and permeation of the biopolymer owing to the pressure so as to compose a soil-biopolymer mixture soil cover for the slope.

This method comprises grouting the high-molecular viscous chain polysaccharide suspension or aqueous solution in the concentration of from about 0.00001% to about 10% into the land at a high pressure, that is, the biopolymer suspension or aqueous solution is deeply permeated and diffused in the soils by using a pressure so as to compose a soil-biopolymer-treated land.

In all the above-described cases, through compacting the soil-biopolymer mixture surface layer after the composition thereof, an adhesion strength of the soil-biopolymer mixture soil to the original layer is promoted, and density of the soil-biopolymer mixture soil is promoted, so that both the strength and the durability can be improved.

2. A Method for Promoting Vegetation of the Soil by Using the High-Molecular Viscous Chain Polysaccharide This method uses a high-molecular viscous chain polysaccharide biopolymer to promote vegetation of a soil. Since the high-molecular viscous chain polysaccharide is highly hydrophilic, it has effects of not only maintaining a good water environment in a soil, but also improving ventilation and drainage of a soil, and furthermore, facilitating growth of plant roots so as to promote vegetation in its entirety. Specific performance of this method is described below.

1) Vegetation Soil Composition Using a Biopolymer Mixture Soil

Germination and growth of plants are promoted by cultivating plants by directly using, as a vegetation soil, a mixture soil containing an about 0.0001% to about 5% high-molecular viscous chain polysaccharide biopolymer with respect to a dry weight of soils.

2) Vegetation Cultivation Using a Biopolymer Suspension or Aqueous Solution

This method uses the high-molecular viscous chain polysaccharide suspension or aqueous solution in a concentration of from about 0.00001% to about 10% as cultivation water upon vegetation cultivation, and has effects in suppressing loss of water supplied and improving durability of a peripheral soil of the plants so as to prevent loss of farmland soil, and simultaneously, promote growth of the plants.

3. A Method for Promoting the Soil Strength by Using High-Molecular Viscous Gelled Polysaccharide A high-molecular viscous gelled polysaccharide generally refers to a material, which exhibits low viscosity in the suspension or aqueous solution state but forms gel with high strength through chemical or heat treatment, and this method promotes strength of a soil by using the high-molecular viscous gelled polysaccharide and specifically suggests the following methods.

1) Promotion of Strength of a Soil-High-Molecular Viscous Gelled Polysaccharide Mixture Soil Through Chemical Treatment About 0.0001% to about 5% high-molecular viscous gelled polysaccharide with respect to a dry weight of a soil is mixed with the soil to compose a mixture soil having a water content of from about 10% (sand) to about 200% (clay) depending on a type of the soil, and then, a cation of an alkali metal ($Na^+$, $K^+$ and etc.) or an alkali earth metal ($Ca^{2+}$, $Mg^{2+}$, and etc.) is added thereto to induce gelation of the biopolymer and compose a rigid soil-biopolymer mixture.

2) Promotion of Strength of a Soil-High-Molecular Viscous Gelled Polysaccharide Mixture Soil Through Heat Treatment About 0.0001% to about 5% high-molecular viscous gelled polysaccharide with respect to a dry weight of a soil is mixed with the soil to compose a mixture soil having a water content of from about 10% (sand) to about 200% (clay) depending on a type of the soil, and then, the soil mixture is sufficiently heated under a condition of from about 80° C. to about 120° C., and then, cooled to a temperature of from about 40° C. to about 60° C. or less to form gel and compose a rigid soil-biopolymer mixture soil.

Otherwise, the high-molecular viscous gelled polysaccharide suspension or aqueous solution in a concentration of from about 0.00001% to about 10% is sufficiently heated under a condition of from about 80° C. to about 120° C., and then, cooled while being mixed with a soil in a condition of a water content ranging from about 10% (sand) to about 200% (clay) to induce gel formation at a temperature of from about 40° C. to about 60° C. or less so as to compose a rigid soil-biopolymer mixture soil.

In both the above-described two cases, it is possible to compose a stronger soil-biopolymer mixture soil by adding the alkali metal or alkali earth metal material as suggested in 3-1) upon the mixing.

4. A method for promoting soil durability by using high-molecular viscous gelled polysaccharide A high-molecular viscous gelled polysaccharide biopolymer generally exhibits low viscosity in the untreated neutral (pH about 7) suspension or aqueous solution state, but forms gel with high strength through chemical or heat treatment. This high-molecular viscous gelled polysaccharide is easily bound to soil particles, especially, clayey soil particles due to the electric property of its surface to form a rigid soil-biopolymer matrix. Based on this interactive behavior, it is possible to promote strength of a soil and resistance against erosion by using the high-molecular viscous gelled polysaccharide. Specific performance in this regard is described below.

1) Surface Treatment Through Spraying

After the high-molecular viscous gelled polysaccharide in the powder state is sprayed on a soil surface, water is sprinkled thereon to induce permeation into the soil, and simultaneously, cause expansion and condensation of the highly-hydrophilic high-molecular viscous gelled polysaccharide so as to form a biopolymer film on the entire soil surface.

In this case, there are three methods for the sprinkling of water. Firstly, there is a method using pure (neutral or weakly alkaline) water; secondly, there is a method using pure water for first sprinkling and an acidic aqueous solution with low pH (pH about 5 or less) or a cationic aqueous solution for second sprinkling to promote condensation of the permeating high-molecular viscous gelled polysaccharide; and finally, there is a method of directly sprinkling an acidic aqueous solution (pH about 5 or less) or a cationic aqueous solution.

The high-molecular viscous gelled polysaccharide is dissolved in water, and sprinkled in the suspension or aqueous solution state with a concentration of from about 0.00001% to about 10% on the soil surface, in which the viscosity is adjusted by changing the concentration of the suspension or aqueous solution depending on a type of the soil so as to facilitate the permeation into the land, the suspension or aqueous solution is bound to the soil immediately upon the permeation so as to form a soil-biopolymer matrix, and the strength of the soil can increase as the water is dried.

In this case, there are three methods for sprinkling the suspension or aqueous solution. Firstly, there is a method of sprinkling the biopolymer suspension or aqueous solution as it is; secondly, there is a method of adding a salt to the biopolymer suspension or aqueous solution to increase pH (about 9 or more) and lower the viscosity of the suspension or aqueous solution, and then, sprinkling the suspension or aqueous solution to improve the permeation into the land; and thirdly, there is a method of firstly sprinkling the biopolymer suspension or aqueous solution with pH about 9 or more increased by adding salt, and then, secondly sprinkling an acidic aqueous solution with low pH (pH about 5 or less) to promote condensation of the permeating high-molecular viscous gelled polysaccharide.

2) Surface Layer Mixture Treatment

This method comprises pre-mixing a soil and the high-molecular viscous gelled polysaccharide with each other, and then, pours the mixture on a surface to form a pack or cover; that is, an in-situ or transported soil is mixed with the high-molecular viscous gelled polysaccharide biopolymer and neutral or alkaline water (pH about 6 to about 13) to make a soil mixture, and then, pours the soil mixture on the site; specifically, the soil mixture is composed by adding a biopolymer at a ratio of from about 0.0001% to about 5% with respect to a dry weight of the soil, and mixing water with the mixture at a ratio of from about 10% to about 200% with respect to a weight of the soil depending on a type of the soil (sand or clay), and then, pours the soil mixture on the site to reach a desired thickness. After the pouring, an acidic aqueous solution with low pH (pH about 5 or less) or a cationic aqueous solution may be sprinkled on the surface to induce permeation, and thereby, enhancing the gel structure of the viscous gelled biopolymer within the mixture soil.

The method comprises mixing the soil with the biopolymer while stirring a surface of an in-situ soil, that is, a soil-biopolymer mixture soil is composed by stirring a soil by means of equipment like a plough or an auger, and simultaneously, sprinkling or grouting the biopolymer in the powder or liquid state (pH about 7 to about 13). After the mixing and stirring, an acidic aqueous solution with low pH (pH about 5 or less) or a cationic aqueous solution may be sprinkled on the surface to induce the permeation, and thereby, enhancing the gel structure of the viscous gelled biopolymer within the mixture soil.

3) Method Using a Pressure

For a slope, which cannot be subject to the surface layer treatment using spraying or pre-mixing, this method comprises spraying a high-molecular viscous gelled polysaccharide suspension or aqueous solution (pH about 6 to about 13) in a concentration of from about 0.00001% to about 10% at a high pressure to promote both stirring of a soil of the slope and permeation of the biopolymer due to the pressure so as to compose a soil-biopolymer mixture soil cover on the slope. After the spraying, an acidic aqueous solution with low pH (pH about 5 or less) or a cationic aqueous solution may be sprinkled on the surface to enhance the gel structure of the viscous gelled biopolymer within the mixture soil cover.

This method comprises grouting the high-molecular viscous gelled polysaccharide suspension or aqueous solution in the concentration of from about 0.00001% to about 10% into the land at a pressure, that is, the biopolymer suspension or aqueous solution is deeply permeated and diffused in the soil by using a pressure to compose a soil-biopolymer-treated land. After grouting, an acidic aqueous solution with low pH (pH about 5 or less) or a cationic aqueous solution may be additionally grouted to enhance the gel structure of the viscous gelled biopolymer of the soil-biopolymer mixture soil within the land.

In all of the above-described cases, through compacting the soil-biopolymer mixture surface layer after the composition thereof, it is possible to promote not only an adhesion strength of the soil-biopolymer mixture soil to the original layer, but also density of the soil-biopolymer mixture soil, and thereby, improving both the strength and the durability.

5. Method for Improving Permeation of the High-Molecular Viscous Biopolymer into Soils High-molecular viscous chain polysaccharide biopolymers are generally polymers having a molecular weight of about 10,000 Da or more and exhibit high viscosity in the neutral or acidic (pH about 7 or less) suspension or aqueous solution state because the chains (fiber) are tangled with one another. Especially, the viscous chain polysaccharide, of which surface has a negative charge, tends to exhibit high viscosity as pH decreases. Meanwhile, the high-molecular viscous chain polysaccharide biopolymer expands and becomes a suspension or aqueous solution having significantly high viscosity due to its high hydrophilicity.

As described, in order to increase permeation of the high-molecular viscous biopolymer into the soil, the viscosity should be reduced. To this end, the example embodiments provide the following methods.

1) Method Using Chemical Treatment

The viscosity decreases when pH of the high-molecular viscous chain or gelled polysaccharide suspension or aqueous solution in the concentration of from about 0.00001% to about 10% increases to about 9 or more. When the biopolymer suspension or aqueous solution with the decreased viscosity is sprinkled on the land or grouted thereinto through a pressure, the permeation or diffusion into the land can be improved.

After the sprinkling or grouting of the alkaline high-molecular viscous chain polysaccharide suspension or aqueous solution into the soil, an acidic aqueous solution with low pH (pH about 5 or less) may be additionally sprinkled or grouted to improve condensation of the viscous chain biopolymer within the soil-biopolymer mixture soil and gelation of the viscous gelled biopolymer.

2) Method Using Physical Treatment

This method comprises decreasing the viscosity of the high-molecular viscous chain polysaccharide biopolymer solution by using a beadmill or the like, that is, the solution is stirred by using a bead at a velocity of about 10,000 ppm or more to untangle the tangled polysaccharide chains.

In addition, the tangled polysaccharide chains may be physically untangled through collision of the high-molecular viscous chain polysaccharide biopolymer solution at a high pressure (about 150 bars or more). For Polycan™, which is a chain polysaccharide biopolymer solution, the viscosity of the crude solution is about 1,000 cps, but the viscosity decreases to about 30 cps when the solution collides at 200 bars by using a homogenizer and further decreases to about 16 cps when the solution with about 30 cps collides once again. After the high-molecular viscous chain polysaccharide biopolymer having the physically decreased viscosity is mixed with or grouted into the soil, an acidic aqueous solution with low pH (pH about 5 or less) or a cationic aqueous solution may be additionally sprinkled or grouted to promote condensation of the viscous chain biopolymer within the soil-biopolymer mixture soil.

3) Method Using Heat Treatment

When the high-molecular viscous gelled polysaccharide suspension or aqueous solution in the concentration of from about 0.00001% to about 10% is sufficiently heated in the condition of from about 80° C. to about 120° C., the viscosity of the biopolymer suspension or aqueous solution decreases. When the suspension or aqueous solution is mixed with or grouted into the soil in the high temperature state, it is naturally cooled, forming a gel at a temperature of from about 40° C. to about 60° C. or less so as to compose a rigid soil-biopolymer mixture soil.

In an example embodiment, the biopolymer may be added to soils of various target areas for various purposes through various methods as described below, but the present disclosure may not be limited thereto.

1. Land Surface Covering Technology Using the High-Molecular Viscous Polysaccharide Biopolymer 1-1. Method Using Spraying or Sprinkling This method comprises directly spraying a biopolymer suspension on the land surface and can be easily applied to slopes as well as flatlands; that is, the biopolymer is diluted in the solid or liquid state at a certain ratio, and sprayed by using a pump, a transfer tube, and a nozzle, so that the biopolymer suspension permeates into the land due to gravity and is bound to soil particles to form a cover.

1-2. Method Using Wet Mixing-Spreading

This method comprises composing a biopolymer mixture soil through pre-mixing, and then, spreading the mixture soil on a target area and compacting the same to form a cover with a certain thickness. This technology is advantageous in that it can form a homogeneous quality cover in a site, and an adhesion force to the original layer can be improved through the compacting.

This method is accomplished by a device capable of diluting the biopolymer in the solid or liquid state at a certain ratio, and simultaneously, spreading the diluted biopolymer, and a compacting device capable of compacting the spread soil. For the compacting device, a roller or vibration type device may be used.

This method can improve a coating strength of the cover surface in cooperation with 1-1. This method is useful in the case where a large quantity of in-situ soils is available from the site.

1-3. Method Using Dry Mixing-Spraying

This method can be applied when a land surface soil is in a dried state like a dry area, and comprises directly dry-mixing a dried soil and a biopolymer in the powder state with each other in a site, and then, spraying water to form a cover.

2. Farmland or Pastureland Protection Using the High-Molecular Viscous Polysaccharide Biopolymer Change in use of a land resulting from farming and pasturing has been regarded as the most critical cause for the soil loss. Accordingly, the biopolymer treatment technology can be greatly effectively used for suppression of the soil loss in farmlands and pasturelands.

2-1. Farmland Cultivation Using the High-Molecular Viscous Polysaccharide Biopolymer This method performs ploughing with a biopolymer powder or suspension when cultivating a farmland prior to sowing seeds. Generally, since a surface of a farmland prior to sowing seeds is hard, if the biopolymer suspension is sprayed in advance, not only the efficiency of the ploughing work can be increased, but also the surface soil and the biopolymer are evenly mixed with each other so that resistance against erosion of the entire farmland can be improved.

Otherwise, there may be a method that mounts a spray nozzle directly on the head part of the plough such that the biopolymer suspension is supplied from the front end of the plough, simultaneously with the ploughing, so as to improve local efficiency.

2-2. Farmland and Pastureland Protection Using a Plane

For the recent modern farming, cases of spraying insecticides-herbicides on enormous farmlands or pasturelands by using a plane are increasing. Accordingly, for the soil erosion resistance promotion using the biopolymer suggested in the example embodiments, the technology of spraying the biopolymer suspension on a farmland and a pastureland, if necessary, by using a plane may be also suggested.

3. Environment-Friendly Water Space Composition Using the High-Molecular Viscous Polysaccharide Biopolymer Since a water space is adjacent to water, it always has the possibility of erosion by water. Accordingly, upon composing a water space, reduction of the entire soil loss is expected through improvement of the land by using the biopolymer.

4. Coastal Soil Protection Using the High-Molecular Viscous Polysaccharide Biopolymer The biopolymer treatment may be used for protection of coast lands such as coastal sand beaches and dunes.

5. Vegetation Land Composition Technology Using the High-Molecular Viscous Polysaccharide Biopolymer Since the biopolymer treatment improves germination and growth of vegetation, it may be applied to sites in various ways.

5-1. Method Using Spraying

Figure 13:
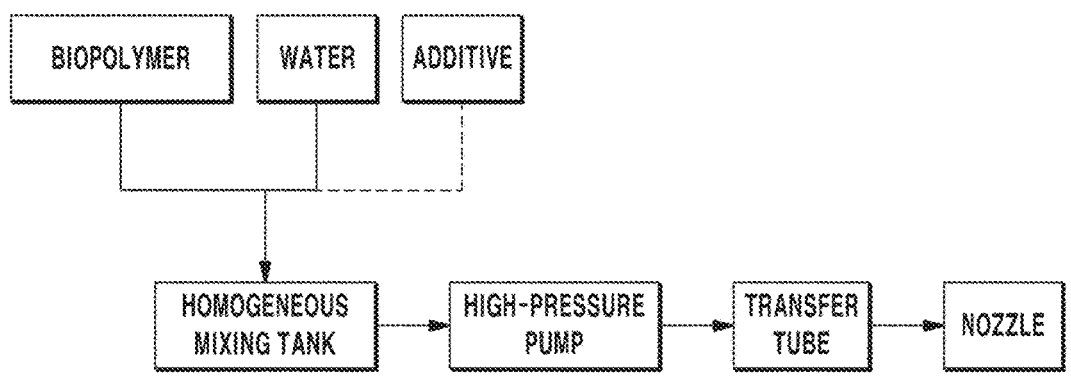
FIG. 13 shows a schematic diagram of biopolymer-treated vegetation land composition using a spraying method in accordance with an example embodiment.

This method comprises spraying a biopolymer suspension at a high pressure and can be easily applied to slopes as well as flatlands; and the method is accomplished by a mixing tank capable of diluting a biopolymer in the solid or liquid state at a certain ratio, and homogeneously mixing the biopolymer with additives or others according to occasions, a high-pressure pump and a transfer tube system, which are suitable for the high viscosity property of the biopolymer suspension, and a special nozzle capable of effectively spraying the biopolymer mixture solution (FIG. 13). The special nozzle should meet the requirement for spraying fine particles such as vegetation seeds.

5-2. Method Using Wet Mixing and Spreading

This method comprises composing a biopolymer mixture soil through pre-mixing, and then, spreading the biopolymer mixture soil on a target area and compacts the same to form a cover with a certain thickness. This technology is advantageous in that it can form a homogeneous quality cover on a site, and an adhesion strength to the original layer can be increased through the compacting.

Figure 14:
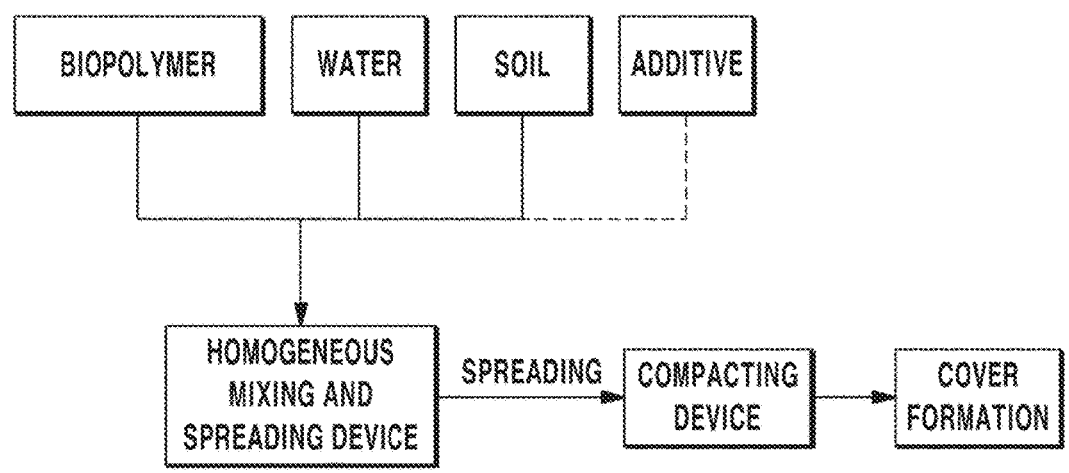
FIG. 14 is a schematic diagram of biopolymer-treated vegetation land composition using a wet mixing-spreading method in accordance with an example embodiment.

This method is accomplished by a device capable of diluting a biopolymer in the solid or liquid state at a certain ratio and mixing the biopolymer with other additives, and simultaneously, spreading the mixture, and a compacting device capable of compacting the spread soil (FIG. 14). For the compacting device, a roller or vibration type device may be used.

This method can improve the coating force of the cover surface in cooperation with Method 5-1. This method is useful when a large quantity of in-situ soils is available from a site.

5-3. Method Using Dry Mixing-Spraying

This method relates to a dry mixing and spraying method using a double transfer system without pre-mixing, in which a liquid biopolymer, a soil and other additives are mixed with one another, while being sprayed, and then, the mixture is adhered to the original layer, and the effect of the method is maximized when a powder or culture soil in the dried state are used.

The core of this method lies in the double transfer of a material to be sprayed, in which a wet transfer system transfers and sprays a biopolymer suspension in the liquid state, and a dry transfer system transfers and sprays a soil and other additives in the dry state, so as to reduce problems in construction such as clogging of a transfer tube, and furthermore, maximize field work efficiency.

Figure 15:
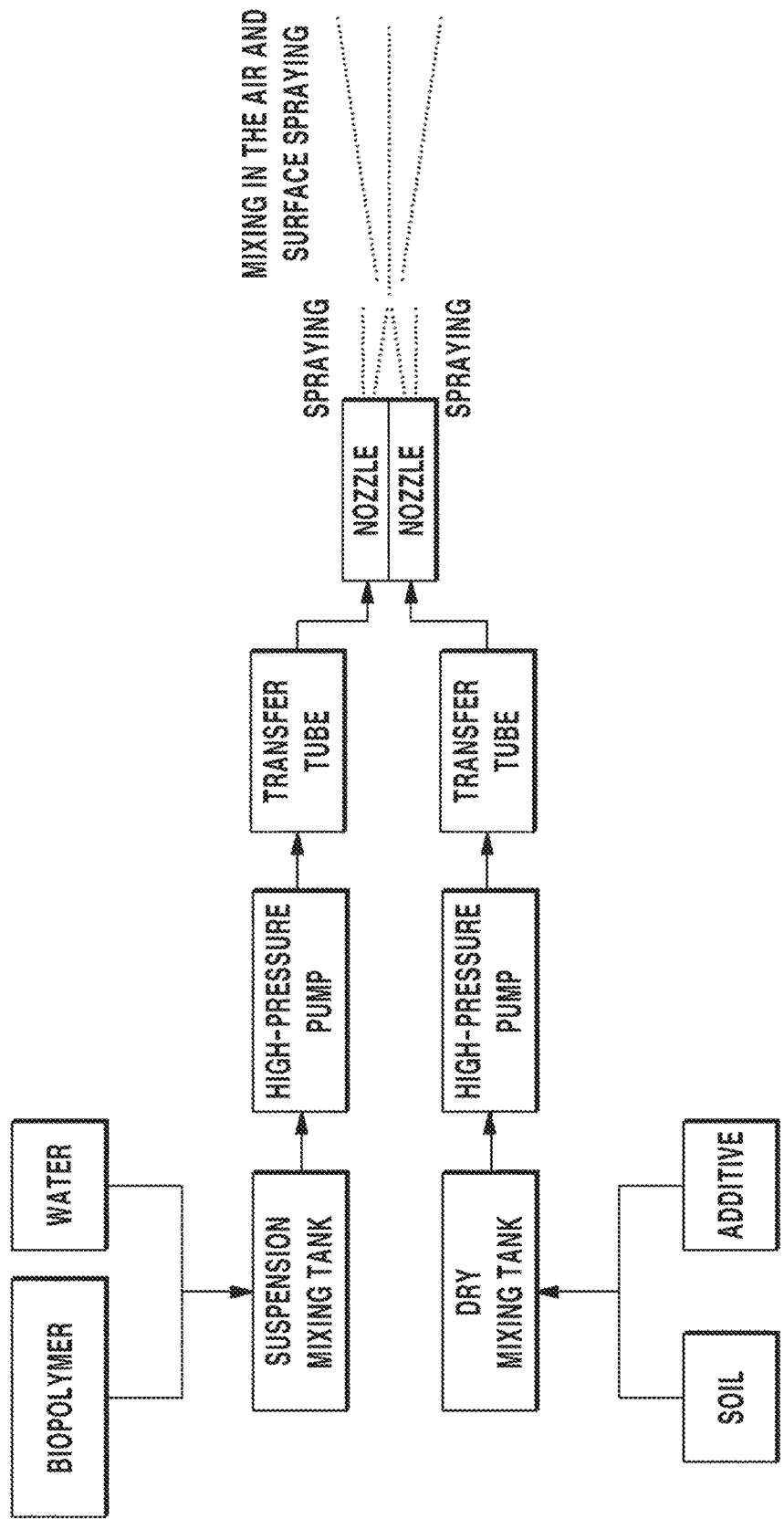
FIG. 15 is a schematic diagram of biopolymer-treated vegetation land composition using a dry mixing-spraying method in accordance with an example embodiment.

The system of this method largely consists of a mixing tank that composes a biopolymer suspension in the liquid state, a high-pressure pump and a transfer tube system, which are suitable for the high viscosity property of the biopolymer suspension, a mixing tank that uniformly mixes a soil in the solid state and other additives with each other, a pump for solid and a transfer tube system, which are capable of performing transfer at a high pressure, and a double nozzle that is capable of independently spraying a biopolymer in the liquid state, a soil in the solid state, and other additives (FIG. 15).

6. Environment-Friendly Landscaping Using the High-Molecular Viscous Polysaccharide Biopolymer It is verified from methods 3 and 4 above in accordance with an example embodiment that the high-molecular viscous polysaccharide biopolymer treatment has an effect in promotion of the germination and growth of vegetation. Accordingly, the example embodiments suggest an environment-friendly landscaping composition method using the biopolymer without depending on a conventional chemical fertilizer.

In case of a flatland, the high-molecular viscous polysaccharide biopolymer cover layer is formed on a surface layer, and then, seeds are directly sowed or a vegetation mat is installed on the cover layer. After the sowing of seeds, the seeds are left as they are without undergoing follow-up treatment, or a soil cover with a certain thickness is composed to protect the seeds from external environments, and simultaneously, promote germination of the seeds.

In case of a slope, the biopolymer cover layer is formed on the surface, and then, seeds are directly sprayed or a vegetation mat is constructed on the cover layer. After the sowing of seeds, the seeds are left as they are without undergoing follow-up treatment, or a cover with a certain thickness is additionally composed to protect the seeds from the external environments and promote germination of the seeds.

Figure 16:
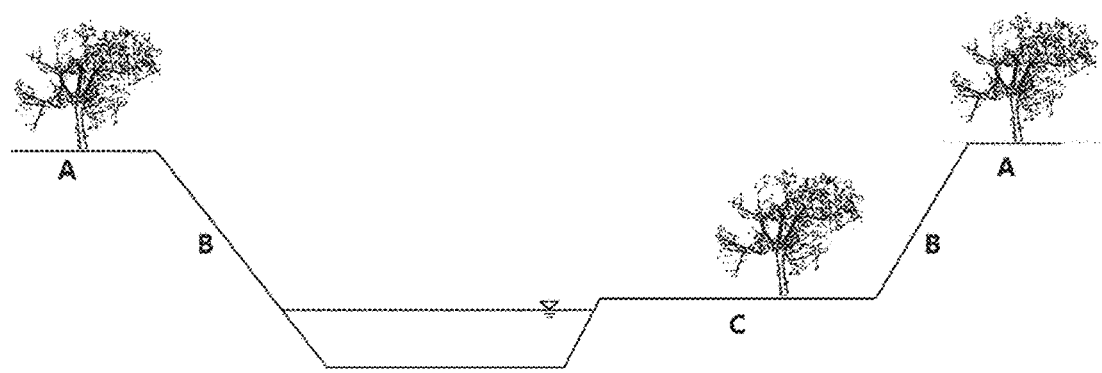
FIG. 16 is a schematic diagram of environment-friendly water space composition using a biopolymer in accordance with an example embodiment.

7. Environment-Friendly Water Space Composition Using the High-Molecular Viscous Polysaccharide Biopolymer Since the biopolymer is environment-friendly and tends to be biodegraded as time lapses, it rarely disturbs the water quality and the aquatic ecosystem when it is applied to a water space, compared to conventional cement or chemical materials; and thus, the biopolymer is expected to be actively applied to environment-friendly water space composition. FIG. 16 shows a general shape of a stream and a water space. In general, a water space is divided into a stream, a levee (B) for preventing flooding of a stream, a terrace land on the river (C) inside the levee, and a peripheral space (A) outside the levee. As a method for composing an environment-friendly water space, the example embodiments perform the following methods in each of the spaces:

A (Peripheral space): All the methods of Method 5 may be applied according to in-situ conditions.

For suppression of retrogressive erosion resulting from stream dredging and change in a water level, the method for stabilizing and improving the soil by using the biopolymer in accordance with the example embodiments may be applied to the peripheral land as an environment-friendly land enforcement method using a biopolymer.

B (Levee): The methods of Method 5-1 or 5-3 may be applied.

For an alternative, which can replace concrete blocks or ripraps used for construction of levees and seawalls, the method for stabilizing and improving the soil by using the biopolymer in accordance with the example embodiments may be applied as a levee and seawall composition method using a biopolymer mixture soil.

Further, the method for stabilizing and improving the soil in accordance with the example embodiments may be applied as a levee surface covering method using the biopolymer in order to suppress water penetration over the levees upon a full or flood water level.

C (Terrace land on the river): All the methods of Method 5 may be applied according to in-situ conditions.

The method for stabilizing and improving the soil in accordance with the example embodiments may be applied as a surface soil erosion resistance improvement method using the biopolymer in order to suppress partial erosion of an inflow part resulting from stream inflow water or irregular soil erosion like gully in a flatland (terrace land on the river).

According to the method for stabilizing and improving the soil by using the biopolymer in accordance with the example embodiments, an environment-friendly soil composition for promoting vegetation and/or a composition for preventing the soil erosion can be prepared. Further, as the method for promoting the vegetation in accordance with the example embodiments uses the biopolymer that is environment-friendly and harmless to the human body, it can improve the structure and the water-retention condition of a soil through interaction of the soil and the biopolymer so as to improve the resistance against erosion, and furthermore, simultaneously realize vegetation promotion and vegetation stabilization (sufficient root anchorage).

The second aspect of the example embodiments provides a soil composition for promoting germination or growth of vegetation, which is prepared by the method for stabilizing and improving a soil of the first aspect and includes the high-molecular viscous biopolymer.

In an example embodiment, the high-molecular viscous biopolymer may be included in about 20 weight parts or less with respect to about 100 weight parts of the soils, but not be limited thereto. For example, the high-molecular viscous biopolymer may be included in from about 0.00001 weight parts to about 15 weight parts, from about 0.00001 weight parts to about 10 weight parts, from about 0.00001 weight parts to about 5 weight parts, about 0.00001 weight parts to about 1 weight part, about 0.00001 weight parts to about 0.5 weight parts, from about 0.00001 weight parts to about 0.1 weight parts, from about 0.0001 weight parts to about 20 weight parts, from about 0.01 weight parts to about 20 weight parts, from about 0.05 weight parts to about 20 weight parts, from about 0.1 weight parts to about 20 weight parts, from about 0.5 weight parts to about 20 weight parts, from about 1 weight part to about 20 weight parts, from about 5 weight parts to about 20 weight parts, or from about 10 weight parts to about 20 weight parts, with respect to about 100 weight parts of the soils, but not be limited thereto.

The third aspect of the example embodiments provides a composition for preventing soil erosion, which is prepared by the method for stabilizing and improving a soil of the first aspect and includes a high-molecular viscous biopolymer.

In an example embodiment, the high-molecular viscous biopolymer may be included in about 20 weight parts or less with respect to about 100 weight parts of the soils. For example, the high-molecular viscous biopolymer may be included in from about 0.00001 weight parts to about 15 weight parts, from about 0.00001 weight parts to about 10 weight parts, about 0.00001 weight parts to about 5 weight parts, from about 0.00001 weight parts to about 1 weight part, from about 0.00001 weight parts to about 0.5 weight parts, from about 0.00001 weight parts to about 0.1 weight parts, from about 0.0001 weight parts to about 20 weight parts, from about 0.01 weight part to about 20 weight parts, from about 0.05 weight parts to about 20 weight parts, from about 0.1 weight parts to about 20 weight parts, from about 0.5 weight parts to about 20 weight parts, from about 1 weight part to about 20 weight parts, from about 5 weight parts to about 20 weight parts, or from about 10 weight parts to about 20 weight parts, with respect to about 100 weight parts of the soils, but not be limited thereto.

The fourth aspect of the example embodiments provides a soil construction material or member, which is prepared by the method for stabilizing and improving a soil of the first aspect and includes the high-molecular viscous biopolymer.

The effect of the soil strength and durability promotion using the biopolymer in accordance with the example embodiments may be applied to the fields of construction and construction materials that use soils. Especially, there are advantages in that through the biopolymer mixture, higher strength and durability than those of soil construction (walls, columns, etc.) simply using soils can be secured; the problem of functionality deterioration caused by biodegradation of organic materials can be overcome, compared to a traditional method using straw or the like; and highly environment-friendly construction is possible, compared to a method using chemical additives (plaster, cement, etc.). The soil construction material and member may include, for example, walls, flooring materials, bricks, blocks, boards, panels, and others, but not be limited thereto. The member means construction subsidiary materials.

Generally, soil construction is constructed by mixing a soil in the natural state with water to secure workability, and then, molding the mixture to be in a brick or block form or applying the mixture directly to walls or floors. In this case, in order to improve strength and durability of the walls or flooring materials, a method that adds fiber like straw or chemical additives is used. The method for constructing soil wall construction by using the biopolymer in accordance with the example embodiments is differentiated from the conventional methods.

In an example embodiment, the soils may include a member selected from the group consisting of a fine-grained soil (clay), a coarse-grained soil (sand), and combination thereof, but not be limited thereto.

In an example embodiment, the high-molecular viscous biopolymer may be included in about 20 weight parts or less with respect to about 100 weight parts of the soils, but not be limited thereto. For example, the high-molecular viscous biopolymer may be included in from about 0.00001 weight parts to about 15 weight parts, from about 0.00001 weight parts to about 10 weight parts, from about 0.00001 weight parts to about 5 weight parts, from about 0.00001 weight parts to about 1 weight part, from about 0.00001 weight parts to about 0.5 weight parts, from about 0.00001 weight parts to about 0.1 weight parts, from about 0.0001 weight parts to about 20 weight parts, from about 0.01 weight parts to about 20 weight parts, from about 0.05 weight parts to about 20 weight parts, from about 0.1 weight parts to about 20 weight parts, from about 0.5 weight parts to about 20 weight parts, from about 1 weight part to about 20 weight parts, from about 5 weight parts to about 20 weight parts, or from about 10 weight parts to about 20 weight parts, with respect to about 100 weight parts of the soil, but not be limited thereto.

THE MODE FOR CARRYING OUT THE INVENTION

Hereinafter, the example embodiments are described in detail by using Examples. However, the present disclosure is not limited to the Examples.

Example 1: Soil Erosion Resistance Measurement Using the Biopolymer

Various indoor experiments for verifying the soil erosion suppression effect of the biopolymer were conducted. In this Example, a beta-1,3/1,6-glucan-based liquid product (8.9 g/L of a beta glucan content; Glucan Corporation) was used as the high-molecular chain biopolymer material.

As the gelled polymer, xanthan gum (Sigma-Aldrich; CAS 1138-66-2) in the pure powder state, which is widely used as a food curing agent, was used in this Example. The most significant property of the xanthan gum is stability in various temperature and pH conditions.

With respect to the basic method for carrying out the invention, a soil was mixed with the corresponding biopolymer, and then, a rainfall condition was reproduced to measure an amount of soil loss in each case and evaluate the resistance against general soil erosion. Specific descriptions in this regard are provided below.

1. Erosion Resistance of the Biopolymer-Treated Soil Against Repeated Rainfall

In this Example, the Korean representative soil, i.e., a granitic residual soil (yellow soil), which includes halloysite $[Al_2Si_2O_5(OH)_4]$ as its essential component, was used as a representative soil sample. After the yellow soil was naturally dried, it was crashed into particles in a size of from 0.07 mm to 0.15 mm, and then, furnace-dried at a temperature of 110° C. to remove residual organic materials.

After three sample plates (A, B and C; refer to FIG. 1) were prepared, and each of the plates was filled with 2,000 g of soils, the soil of A was uniformly mixed with 1,200 g (60% with respect to the weight of the soil) of distilled water, the soil of B was uniformly mixed with 1,200 g of liquid beta-1,3/1,6-glucan (0.5% of beta glucan with respect to the weight of the soil), and the soil of C was uniformly mixed with 10 g of powder xanthan gum and 1,200 g of distilled water.

Figure 2:
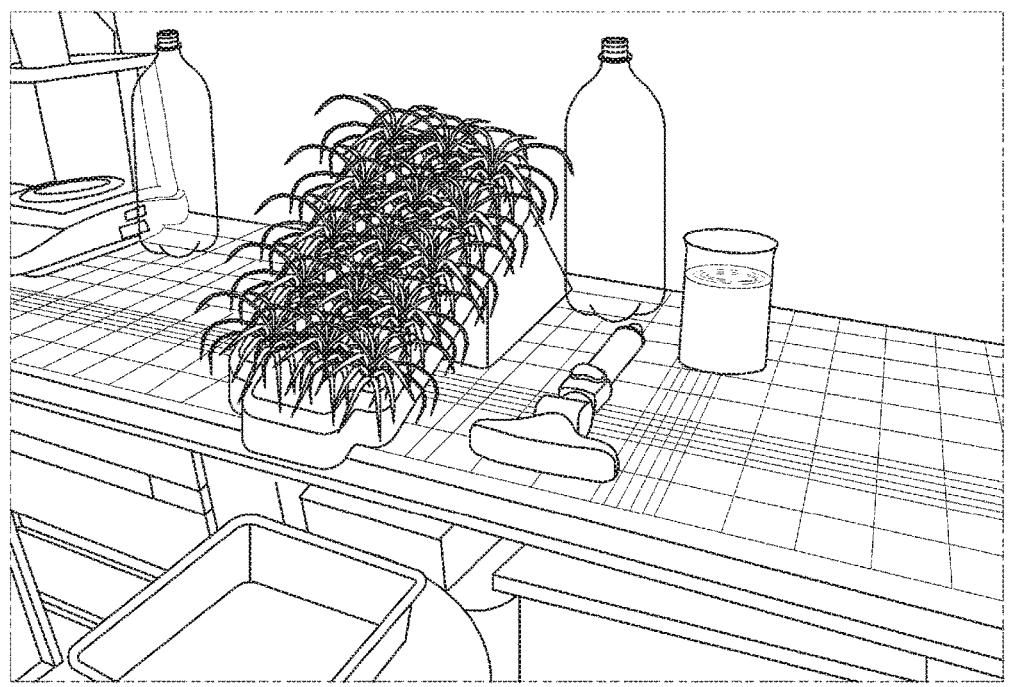
FIG. 2 shows construction of indoor experiments for rainfall erosion simulation in accordance with an example embodiment.

For the rainfall simulation, a sprinkler was used as shown in FIG. 2, and an angle of the sample plates was set to 20°. A total weight of the sample plates was measured prior to the rainfall simulation, and leaked slurry after 500 mL rainfall simulation was collected to measure a volume and mass of the slurry. A total weight of the sample plates after the rainfall simulation was measured to calculate an absorption amount of the land. The leaked slurry was immediately dried to obtain a soil erosion amount based on the difference in mass before and after the drying. The rainfall simulation was performed total 10 times in a two (2)-day cycle.

Table 1 provides a soil loss amount according to each of the rainfall simulations

TABLE 1

Soil loss amount (g) according to each of the rainfall simulations

| Plates | Condition | Soil loss amount (g) by the number of times of rainfall (500 mL/time) | | | | | | | | | |
|---|---|---|---|---|---|---|---|---|---|---|---|
| | | 1 | 2 | 3 | 4 | 5 | 6 | 7 | 8 | 9 | 10 |
| A | Untreated yellow soil | 76 | 39 | 39 | 37 | 33 | 25 | 57 | 42 | 48 | 31 |
| B | Beta glucan-yellow soil | 0 | 0 | 0 | 0 | 0 | 0 | 1 | 0 | 1 | 1 |
| C | Xanthangum-yellow soil | 15 | 2 | 2 | 0 | 1 | 0 | 1 | 0 | 1 | 1 |

Table 2 provides results of converting the soil loss amount by the number of times of rainfall in Table 1 into an accumulated loss rate (%) with respect to the initial total soil weight (2,000 g).

TABLE 2

Accumulated soil loss rate (%) according to the number of times of rainfall

| Plates | Condition | Accumulated soil loss rate (%) according to rainfalls (500 mL/time) | | | | | | | | | |
|---|---|---|---|---|---|---|---|---|---|---|---|
| | | 1 | 2 | 3 | 4 | 5 | 6 | 7 | 8 | 9 | 10 |
| A | Untreated yellow soil | 4.8 | 5.8 | 7.7 | 9.6 | 11.2 | 12.5 | 15.3 | 17.7 | 19.7 | 21.2 |
| B | Beta glucan-yellow soil | 0.0 | 0.0 | 0.0 | 0.0 | 0.0 | 0.0 | 0.05 | 0.05 | 0.1 | 0.1 |
| C | Xanthangum-yellow soil | 0.8 | 0.9 | 1.0 | 1.0 | 1.0 | 1.0 | 1.1 | 1.2 | 1.2 | 1.3 |

As a result of the experiments, it could be identified that the biopolymer-treated soil exhibited an accumulated loss rate of from 0% to 1% for the total 10 rainfall simulations, whereas 21% of the untreated soil was lost. Especially, it could be identified that among the biopolymers, beta-1,3/1,6-glucan exhibited far high resistance against the erosion with an accumulated loss rate of only 0.1%.

2. Erosion Resistance of the Biopolymer-Treated Soil for Intensive Rainfall

In order to verify the erosion resistance against intensive rainfall, in addition to the periodic rainfall, Samples A, B and C were prepared under the same condition as described in Item "1" above for the specific descriptions for carrying out the invention, and then, intensive rainfall was simulated. For the intensive rainfall, 500 mL of rainfall was sprinkled 15 times at an interval of 10 minutes to measure a total weight of the samples and a soil loss amount prior to and after the rainfalls as described above.

Table 3 provides an accumulated loss rate (%) of the soil according to the intensive rainfall simulations.

TABLE 3

Accumulated loss rate (%) according to intensive rainfalls

Accumulated loss rate (%) according to rainfalls (500 mL/time)

| Pots | Condition | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A | Untreated yellow soil | 0.4 | 1.3 | 2.6 | 4.4 | 7.0 | 9.4 | 13.8 | 19.4 | 25.3 | 31.8 | 38.2 | 42.8 | 48.1 | 54.9 | 59.0 |
| B | Beta glucan-yellow soil | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| C | Xanthangum-yellow soil | 0.1 | 0.2 | 0.2 | 0.2 | 0.2 | 0.2 | 0.2 | 0.2 | 0.2 | 0.2 | 0.2 | 0.2 | 0.2 | 0.2 | 0.2 |

Upon comparing the results of Tables 2 and 3, it can be identified that the accumulated loss rate of the untreated soils significantly increases (21.2→31.8; with respect to 10 accumulated rainfalls) under the intensive rainfall condition. Particularly, it could was identified that the resistance of the biopolymer-treated soil against the intensive rainfalls was still high (less than 1%).

Thus, it could be identified that the biopolymer treatment dramatically increased the resistance against the soil erosion under both the repeated and intensive rainfalls.

Example 2: Vegetation Promotion Effect Measurement Using the Biopolymer

In this Example, various indoor experiments were conducted to verify the vegetation promotion effect of the biopolymer. In this Example, a beta-1,3/1,6-glucan-based liquid product (Glucan Corporation) was used as the high-molecular chain biopolymer material. In addition, as the gelled polymer, xanthan gum (Sigma-Aldrich; CAS 1138-66-2) in the pure powder state, which is widely used as a food curing agent, was used in this Example.

With respect to the basic method for carrying out the invention, a soil was mixed with the corresponding biopolymer, and then, crops were sown and cultivated under a constant temperature and humidity condition to identify germination and growth of the seeds, and furthermore, the structure of the soil was analyzed to determine how the biopolymer-treated soil affect growth of plants. Specific descriptions in this regard are provided below.

1. Seed Germination in the Biopolymer-Treated Soil

In this Example, the Korean representative soil, i.e., a granitic residual soil (yellow soil), which includes halloysite $[Al_2Si_2O_5(OH)_4]$ as its essential component, was used as a representative soil sample. After the yellow soil was naturally dried, it was crashed into particles in a size of from 0.07 mm to 0.15 mm, and then, furnace-dried at a temperature of 110° C. to remove residual organic materials.

Figure 3:
FIG. 3 shows an image of test cultivation of a biopolymer-treated soil in accordance with an example embodiment.

Six (6) pots were prepared, wherein three (3) (A, B, C) of the pots were filled with yellow soil as a basic soil, and the other three (3) (D, E, F) were filled with commercially available artificial culture soils for comparison. A and D was subject to the untreated pure soil condition, B and E were mixed with xanthan gum corresponding to 1% of the soil weight, and finally, C and F were mixed with beta-glucan corresponding to 0.5% of the soil weight. About 600 oat seeds as test crops were evenly sprinkled on each of the soils, and then, covered up with soils. After water was sprinkled on all A, B, C, D, E, and F until an initial water content (an amount of water with respect to the weight of soils) condition reached 60%, the pots were placed in a greenhouse having the same temperature and sunshine condition (FIG. 3). The germination and growth tendency was observed every day, and an identical amount of water was supplied to each of the pots upon watering.

Table 4 provides the seed germination results according to the cultivation days of each of the pots.

TABLE 4

Germination amount according to cultivation days

Germination amount (in number) according to time (days)

| Pots | Condition | 0 | 6 | 8 | 10 | 12 | 14 | 16 | 18 | 20 |
|---|---|---|---|---|---|---|---|---|---|---|
| A | Untreated yellow soil | 0 | 0 | 0 | 20 | 224 | 440 | 500 | 500 | 500 |
| B | Xanthan gum-yellow soil | 0 | 0 | 0 | 240 | 400 | 480 | 510 | 510 | 510 |
| C | Beta glucan-yellow soil | 0 | 160 | 320 | 400 | 440 | 520 | 520 | 520 | 520 |
| D | Untreated culture soil | 0 | 62 | 296 | 368 | 400 | 450 | 500 | 500 | 500 |
| E | Xanthan gum-culture soil | 0 | 80 | 210 | 430 | 480 | 500 | 520 | 530 | 530 |
| F | Beta glucan-culture soil | 0 | 220 | 480 | 520 | 530 | 545 | 560 | 560 | 560 |

As a result of the observation, it could be identified that the germination of the seeds was promoted in the biopolymer-treated soils of both yellow soil and the culture soil. Among the biopolymers, beta glucan exhibited higher efficiency than xanthan gum. Especially, in the circumstance that the germination of the culture soils was mostly more favorable than that of yellow soil, yellow soil (C) treated with beta glucan exhibited the better results in germination than the untreated culture soil (D), and thus, it could be identified that the beta glucan treatment generally improves the germination condition of the soil.

2. Plant Growth in the Biopolymer-Treated Soil

Simultaneously with the observation of the seed germination, growth of the whole vegetation was observed in the above-described Example. The observation was performed by dividing each of the pots into 8 sections, and then, measuring an average growth length of vegetation in each of the sections to calculate an average of the whole vegetation growth. Table 5 provides the growth results of each of the pots according to cultivation days.

TABLE 5

Seed germination amount according to cultivation days

| Pots | Condition | Growth (cm) according to time (days) | | | | | | | | |
|---|---|---|---|---|---|---|---|---|---|---|
| | | 0 | 6 | 8 | 10 | 12 | 14 | 16 | 18 | 20 |
| A | Untreated yellow soil | 0 | 0 | 0 | 1.00 | 2.20 | 5.50 | 8.00 | 9.00 | 10.50 |
| B | Xanthan gum-yellow soil | 0 | 0 | 0 | 1.30 | 3.00 | 6.30 | 9.50 | 10.00 | 12.00 |
| C | Beta glucan-yellow soil | 0 | 1.80 | 3.09 | 5.00 | 6.20 | 9.50 | 10.70 | 11.00 | 12.00 |
| D | Untreated culture soil | 0 | 2.00 | 4.09 | 5.60 | 7.30 | 9.30 | 11.00 | 12.50 | 13.00 |
| E | Xanthan gum-culture soil | 0 | 2.00 | 3.60 | 6.00 | 8.10 | 10.50 | 12.00 | 13.50 | 14.00 |
| F | Beta glucan-culture soil | 0 | 2.50 | 4.86 | 7.80 | 12.00 | 13.50 | 16.00 | 17.00 | 17.50 |

Figure 4:
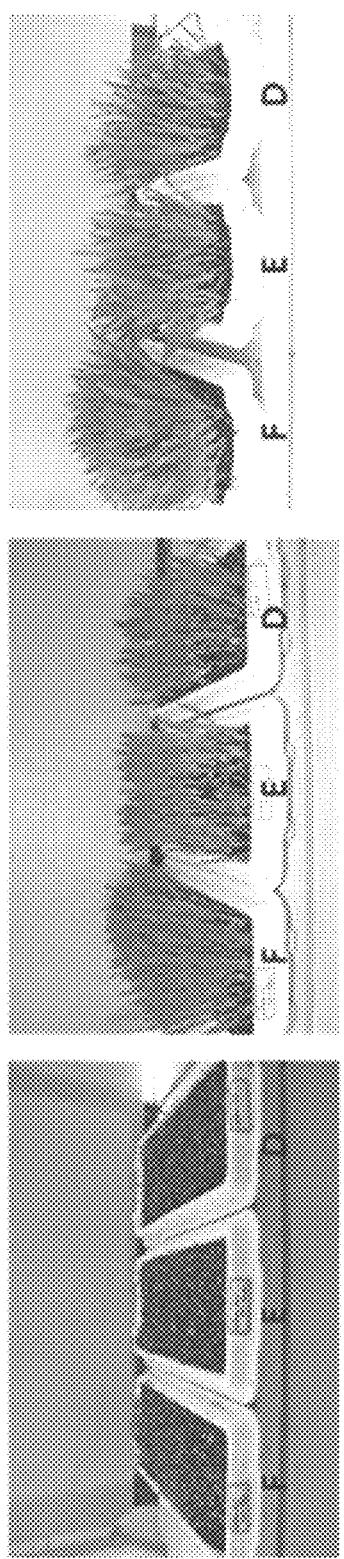
FIG. 4 shows images of vegetation growth results of a biopolymer-treated soil according to time in accordance with an example embodiment.
Figure 4:
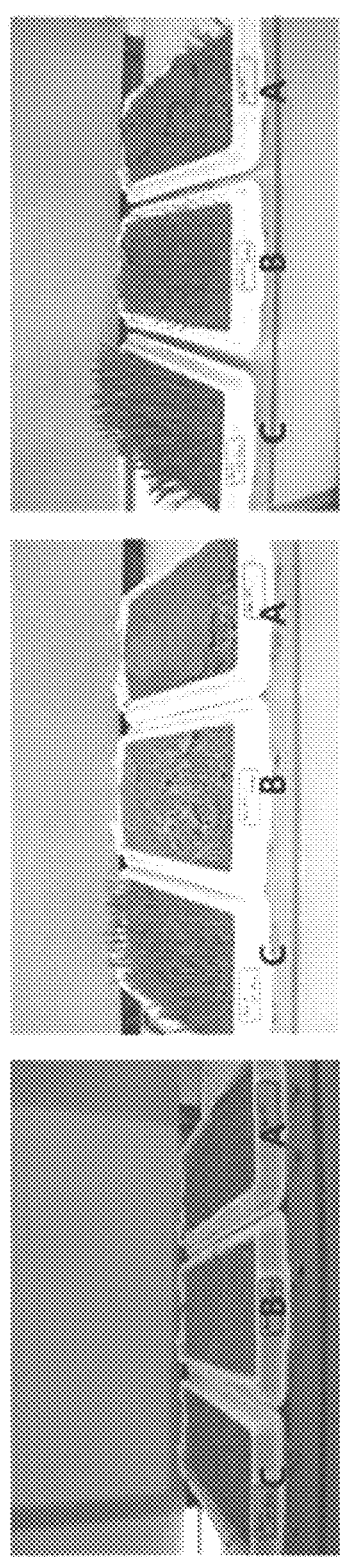

As a result of the cultivation, it could be identified that growth of vegetation was promoted in the biopolymer-treated soils of both yellow soil and the culture soil (FIG. 4). Among the biopolymers, beta glucan exhibited a far higher effect than that of the xanthan gum. In case of yellow soil, it could be identified that the plant growth in the beta glucan-treated soil was promoted maximum 5 times in the initial stage (0 to 12 days). Especially, as the growth in beta glucan-treated yellow soil (C) exhibited the similar vegetation tendency to that in the untreated culture soil (D), it could be identified that the beta glucan treatment significantly improves the performance of a soil that is inappropriate for the plant growth.

3. Analysis of Microstructure of the Biopolymer-Treated Soil

In order to verify what interactive behavior of the biopolymer with the soil exhibits in the soil to improve the growth of vegetation, an interactive behavior of soil-biopolymer-vegetation roots was observed by using scanning electron microscope (SEM; Phillips XL30SFEG) equipment (FIG. 5a to FIG. 5c).

Figure 5A:
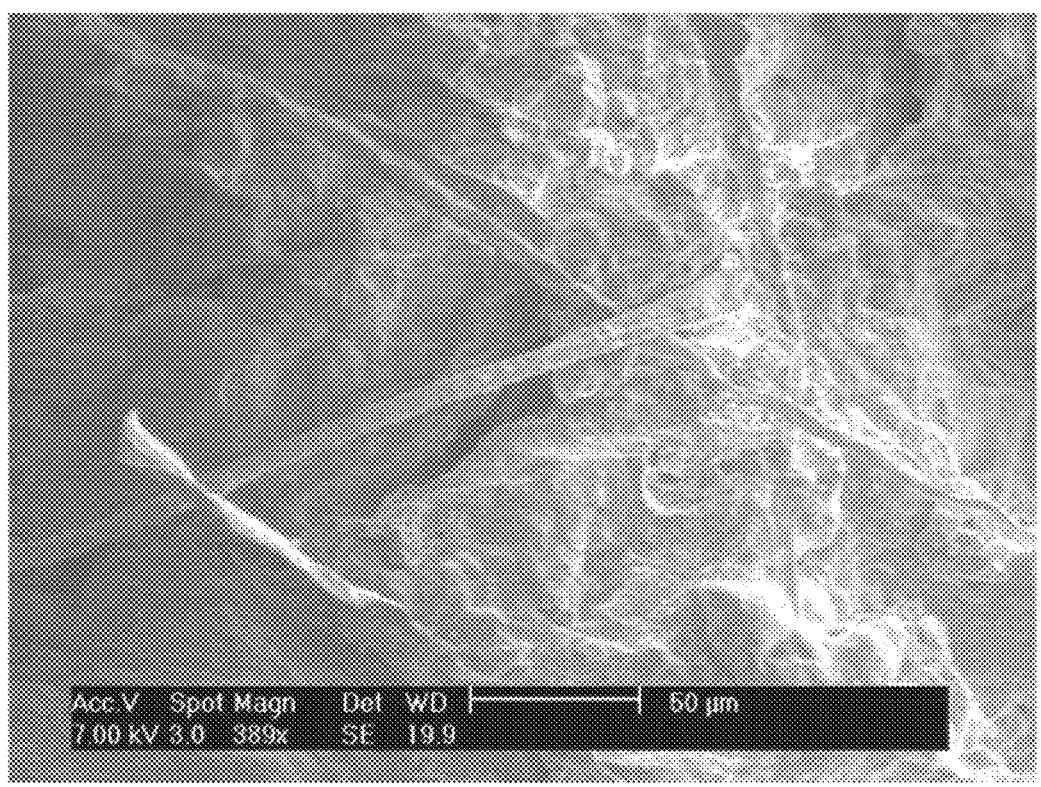
FIG. 5a shows a scanning electron microscope image of untreated yellow soil and vegetation roots in accordance with an example embodiment.
Figure 5B:
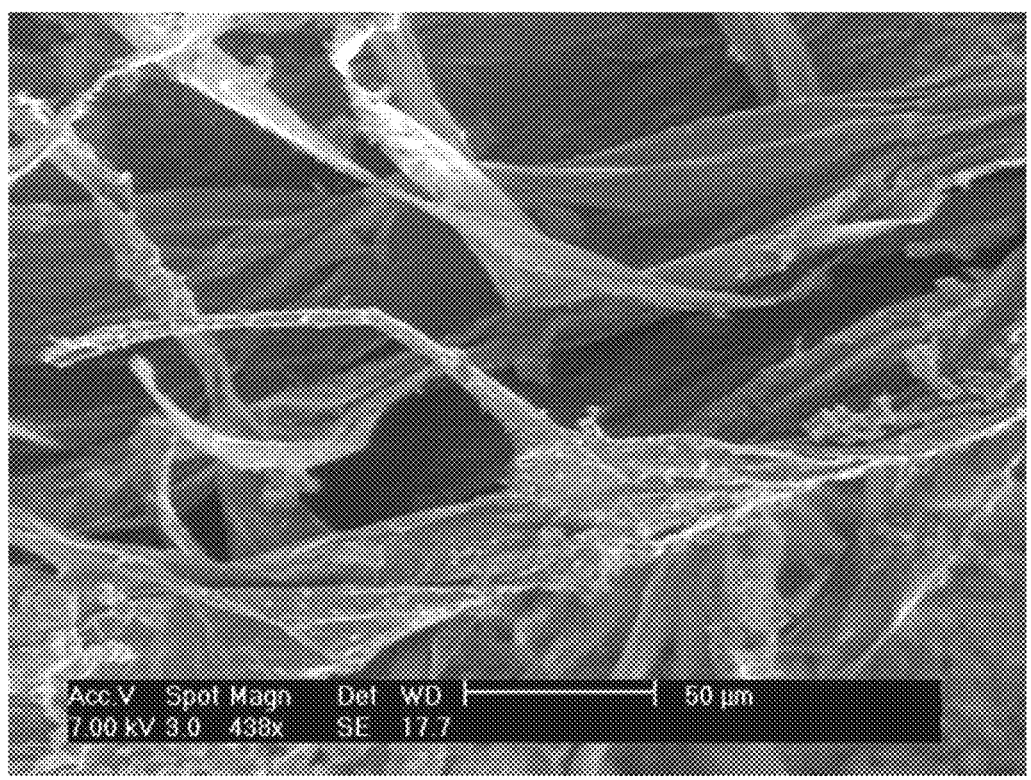
FIG. 5b shows a scanning electron microscope image of beta glucan-treated yellow soil and vegetation roots in accordance with an example embodiment.
Figure 5C:
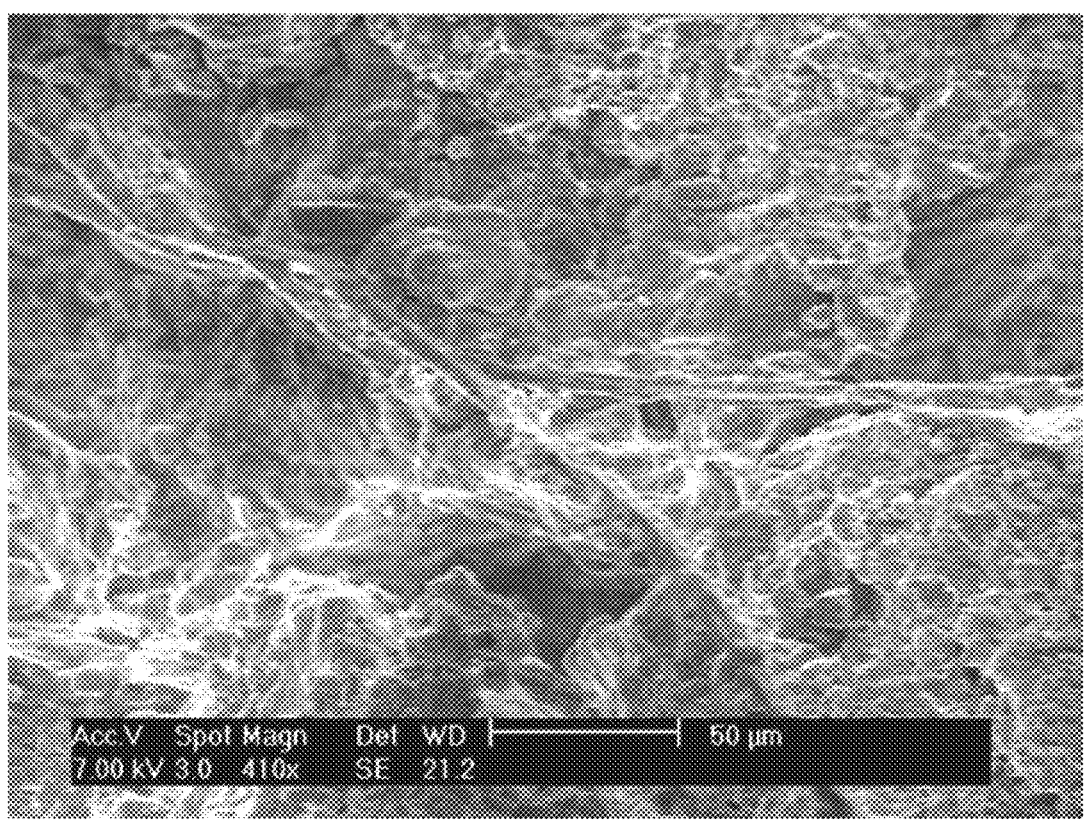
FIG. 5c shows a scanning electron projection microscope image of xanthan gum-treated yellow soil and vegetation roots in accordance with an example embodiment.

FIG. 5a relates to results of untreated yellow soil and shows that yellow soil particles and vegetation roots are very densely attached to one another. For the beta glucan-treated yellow soil of FIG. 5b, it is believed that high-molecular beta glucan chains expand a pore of the soil so as to generally improve ventilation-drainage of the soil. For the xanthan gum-treated soil (FIG. 5c), it was observed that the whole soil structure was more dense than that of the beta glucan-treated soil of FIG. 5b, but looser than that of the untreated soil of FIG. 5a as the soil particles formed lumps here due to gelation. Accordingly, it could be identified that the biopolymer treatment generally expands the pore of the soil so as to compose an environment where roots of vegetation can easily grow.

4. Verification of a Water Content Maintaining Performance of the Biopolymer-Treated Soil Growth of vegetation and a water content of a soil are closely related to each other. Since long-term maintenance of a proper water content of a soil has a favorable function in initial growth of plants, experiments for comparison of a water content maintenance characteristic between the biopolymer-treated soil and common soils were conducted.

After three yellow soil samples in an identical amount (200 g) were prepared, and treated with beta glucan corresponding to 0.5% of the soil weight and xanthan gum corresponding to 0.5% of the soil weight, and untreated, respectively, initial retained water ratios of the samples were conformed to 60%, and then, the samples were dried at a room temperature. The weights of the samples were measured according to time to measure a loss (vaporization) amount of water. Table 6 provides vaporization rate [%; compared to the initial water content (120 g)] results according to time.

TABLE 6

Vaporization rate according to time

| Condition | Vaporization rate (%, with respect to the initial water content of 120 g) according to time (hr) | | | | | | | | |
|---|---|---|---|---|---|---|---|---|---|
| | 6 | 12 | 24 | 36 | 48 | 60 | 72 | 84 | 96 |
| Untreated yellow soil | 8.4 | 10.0 | 23.9 | 32.6 | 43.9 | 48.8 | 57.4 | 64.1 | 98.3 |
| Xanthan gum-yellow soil | 8.0 | 9.6 | 21.7 | 30.1 | 39.2 | 43.0 | 50.5 | 55.4 | 94.9 |
| Beta glucan-yellow soil | 5.5 | 6.7 | 17.3 | 27.1 | 36.0 | 40.2 | 48.8 | 54.3 | 95.8 |

From Table 6, it was identified that all the biopolymers according to the example embodiments maintained the satisfactory water content in the soil, compared to the untreated soil. While the difference between the biopolymer-treated soil and the untreated soil was insignificant at an initial stage since water on the soil surfaces was mostly vaporized, it could be identified that the biopolymer treatment achieved a superior effect in suppressing loss of water in the inside of the soil in the medium- and long-term behaviors in which water within the soil was lost.

Example 3: High-Molecular Viscous Gelled Polysaccharide Biopolymer-Soil Mixture Using Heat Treatment In order to mix the high-molecular viscous gelled biopolymer and a soil with each other by using thermal gelation, irrespective of a type of the soil, a high-molecular viscous gelled polysaccharide biopolymer aqueous solution in the high temperature state and a soil were prepared. After the biopolymer in the powder state was dissolved in a solvent (water) having a high temperature (80° C.), the suspension was mixed with a heated soil to prevent premature gelation resulting from rapid temperature decrease upon the mixing. What is important in forming the hyperthermal biopolymer aqueous solution is that a concentration (a solute amount to the solvent) should be properly adjusted. In general, agar absorbs water corresponding to 20 times its mass at a room temperature due to its hydrophilicity, and the solubility increases with increase of the temperature. It is preferable to compose the hyperthermal solution to be 10% or less (10 g/100 mL) for agar and 3% or less (3 g/100 mL) for xanthan gum because powders having a higher concentration than those described above are not completely dissolved in water.

Figure 6:
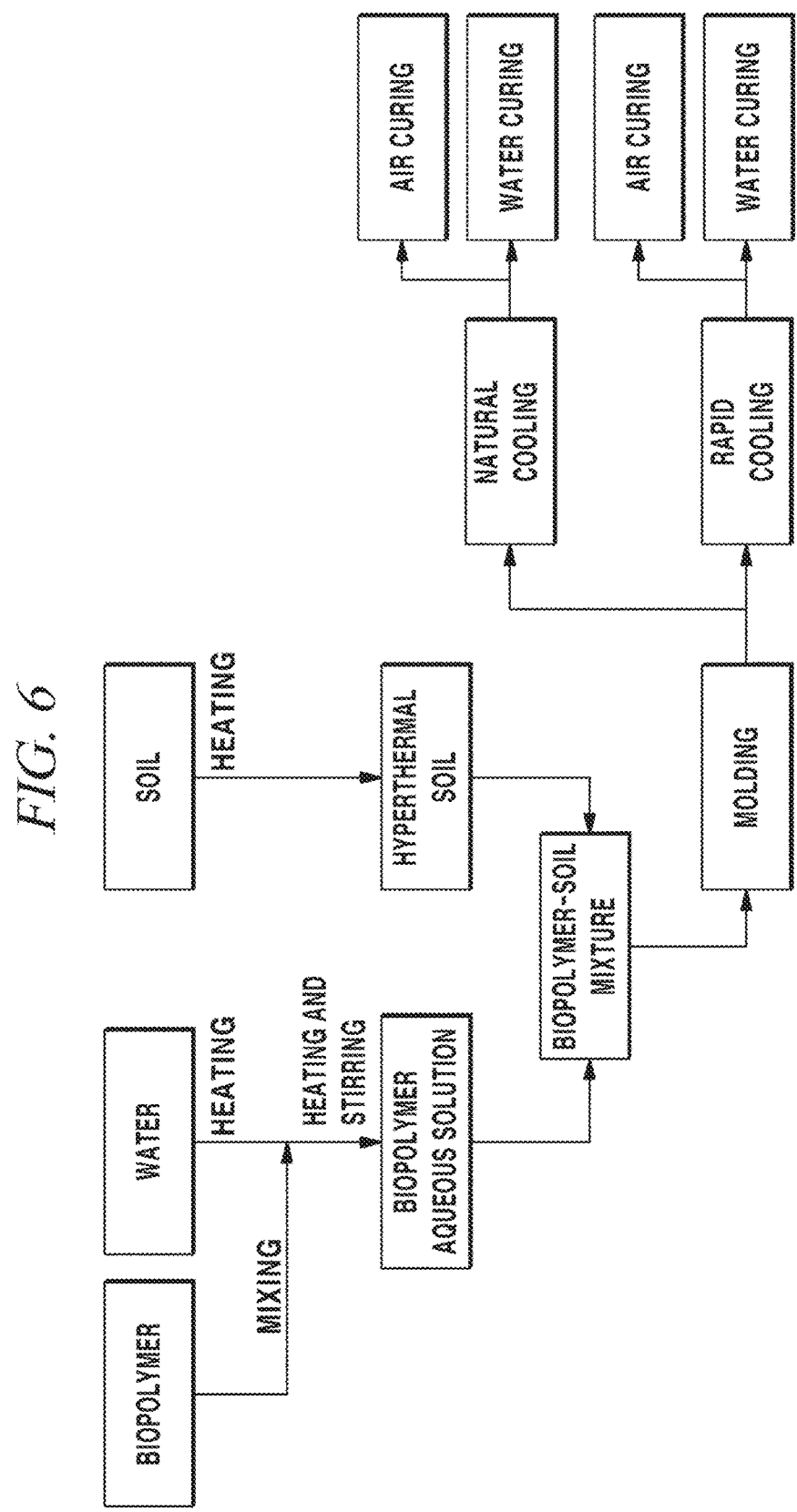
FIG. 6 shows a biopolymer treatment process through heat treatment in accordance with an example embodiment.

The hyperthermal gelled biopolymer solution was uniformly mixed with the hyperthermal soil in a concentration of 60% or less (a solution weight to the soil weight) in case of a (clay-like) soil such as yellow soil and 30% or less in case of a sand-like soil. After the mixing, the mixture was molded for a desired purpose, and then, cured in the air or water. FIG. 6 illustrates the summary of the processes.

Figure 7:
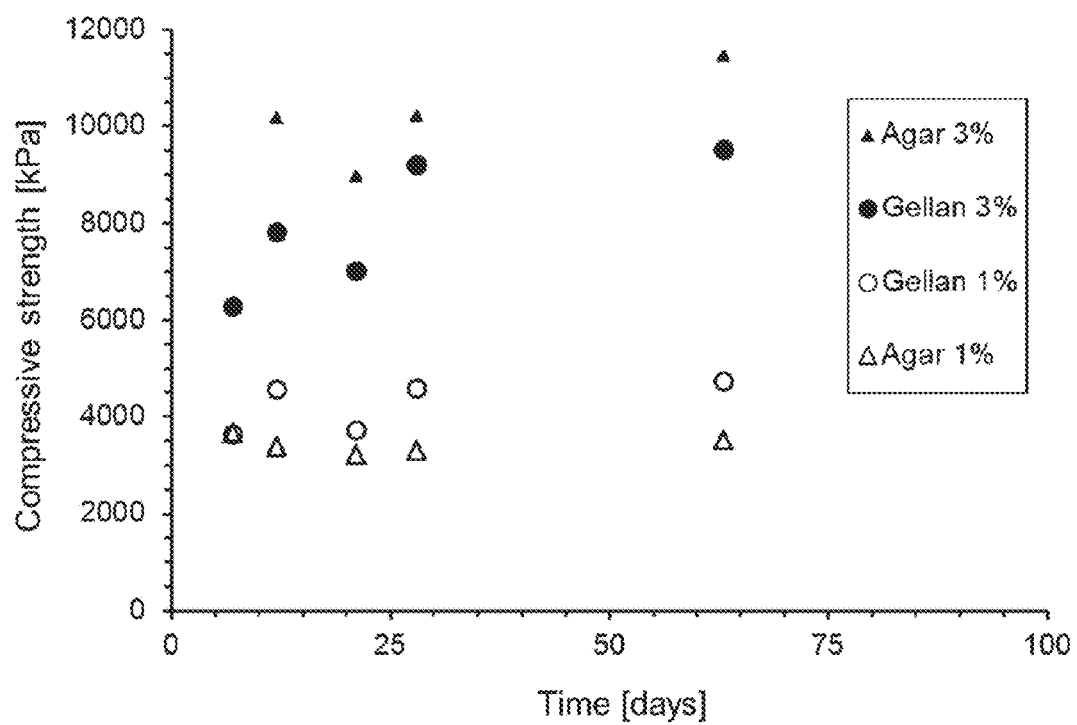
FIG. 7 is a graph showing results of strength measurement of a biopolymer-treated soil (yellow soil) in accordance with an example embodiment.
Figure 8:
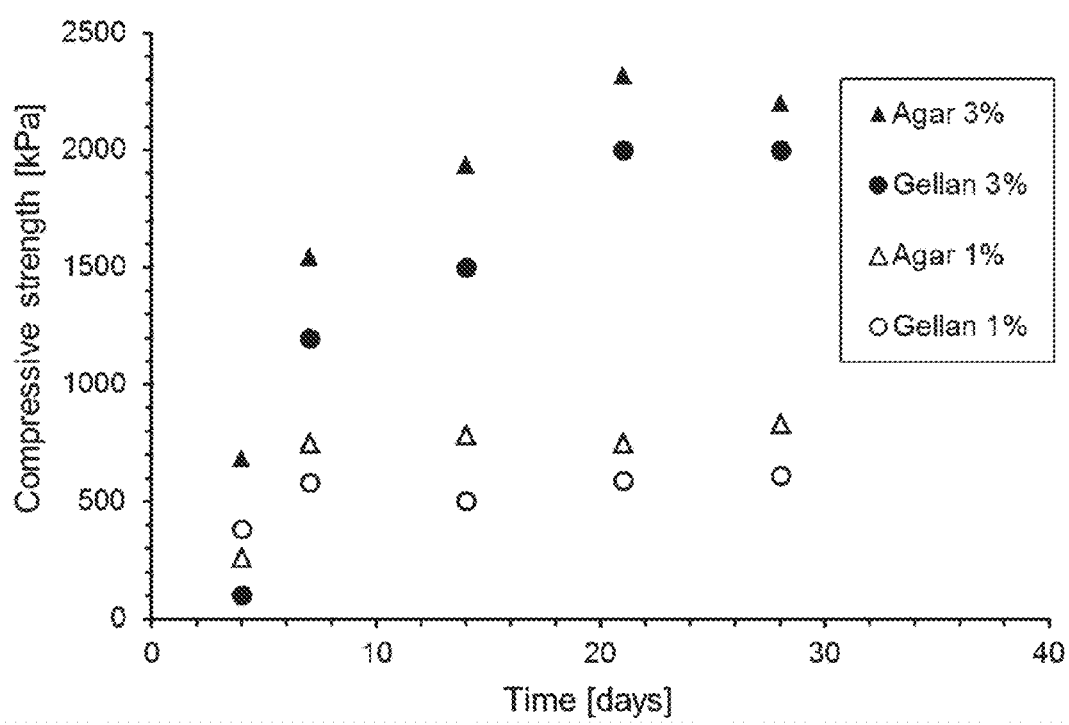
FIG. 8 is a graph showing results of strength measurement of a biopolymer-treated soil (sand) in accordance with an example embodiment.

Example 4: Cooling and Curing Method of the Thermal Gelled Biopolymer-Soil Composition Various high-molecular viscous thermal gelled polysaccharide biopolymer-soil specimens were prepared by using yellow soil and sand in the indoor condition, and strength thereof was measured. Each of the soils was mixed with agar and gellan gum, of which contents were 1% and 3%, respectively, with respect to the soil weight; and an initial water/soil mixing ratio for yellow soil was 60%, and a water/soil mixing ratio for sand was 30%. FIG. 7 (yellow soil) and FIG. 8 (sand) provide the strength of the specimens subject to natural cooling and air curing after the mixing. From the results of FIG. 7 and FIG. 8, it could be identified that the compression strength of the soils significantly increased owing to the thermal gelled biopolymer mixture. Especially, it could be identified that the maximum strength of yellow soil reached 12 MPa to form a very rigid soil composition. This shows that since both agar and gellan gum have a negative charge, they form stronger bond to yellow soil particles having a surface charge.

Figure 9:
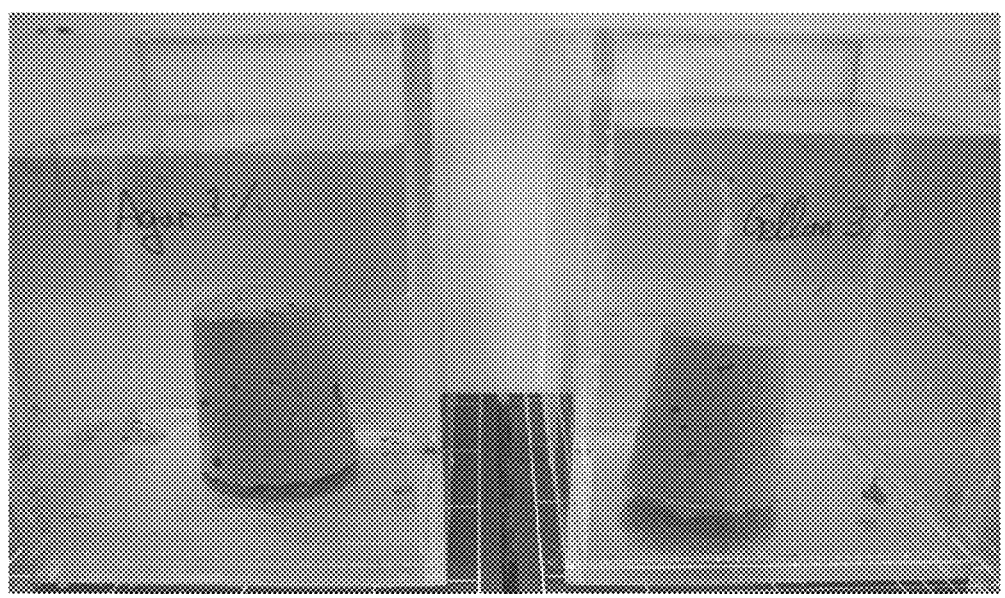
FIG. 9 shows a method for treating a biopolymer-treated soil under rapid cooling and water curing conditions in accordance with an example embodiment.

However, the yellow soil specimens subject to the natural cooling in the air and the air curing exhibited a maximum 20% drying shrinkage (volumetric strain) behavior. In order to resolve this problem, a method for changing the initial cooling after the hyperthermal mixing was studied. As the method for rapidly cooling the specimen (3% agar and 3% gellan gum) immediately after mixing and molding as shown the process of FIG. 6, the specimen was cooled in cold water (FIG. 9). After sufficient cooling, the specimen was subject to air curing, and as a result, it was identified that the final drying shrinkage decreased to 10% or less. Accordingly, it could be identified that the initial gelation of the biopolymer-soil composition was very important to prevent the drying shrinkage, and to this end, various methods such as cold water, refrigerants, cool air, and refrigeration may be applied.

Figure 10:
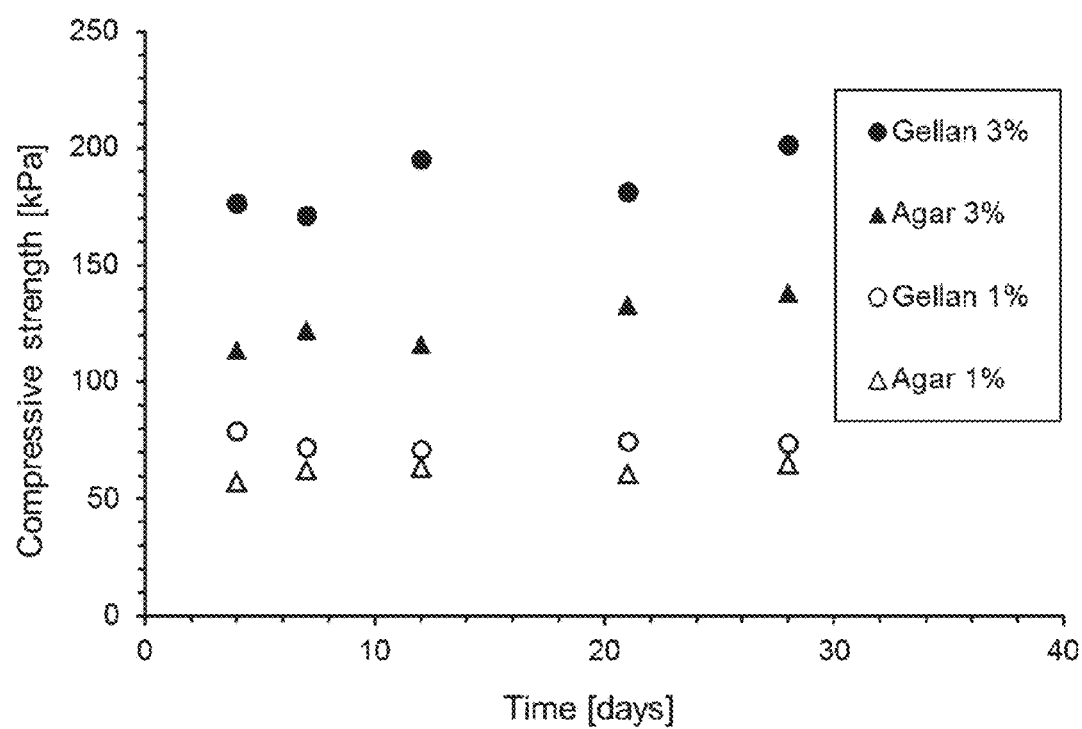
FIG. 10 is a graph showing a behavior of a biopolymer-treated soil under rapid cooling and water curing conditions in accordance with an example embodiment.

Finally, in order to identify behaviors under the rapid cooling and water curing conditions, the specimen was prepared, and then, immediately immersed in water to be thereafter subject to long-term water curing. The long-term immersed and saturated soil exhibited almost no compression strength, whereas the thermal gelled biopolymer-treated soil exhibited about 50 kPa to about 200 kPa of compression strength even in the 28-day immersion condition, which confirms that the thermal gelled biopolymer-soil composition is effective even in the underwater state (FIG. 10). Of particular significance is that the volume change was close to 0% in case of the rapid cooling and the water curing. Accordingly, it has been confirmed that since the thermal gelled biopolymer exhibits no change in volume when the underwater and immersion state is applied, it can be utilized as a highly stable land grouting and treating agent.

Example 5: Evaluation of Durability Against Water

In order to evaluate durability of the thermal gelled biopolymer-treated soil against water, rewetting and strength measurement for the specimen subject to natural cooling and air curing, which are the most sensitive conditions, were conducted. After two months from the curing, the specimen was immersed in water, and the immersion state was maintained for one week. Uniaxial compression strength and a volumetric expansion rate were evaluated on the $7^{th}$ day after the immersion.

A 3% agar-treated soil exhibited 12 MPa of the final strength in the dry state, but the strength decreased to 600 kPa after the immersion; and the dry-state strength of a 3% gellan gum-treated soil was 10 MPa, which decreased to 500 kPa after the immersion. What is important is that while the specimens in all the cases maintained their original shapes, the slight volume expansion due to water absorption occurred (refer to Table 7).

TABLE 7

Results of strength and volume changes of the immersed specimens

| Mixing Condition | Compression Strength | | Volumetric Change Rate (compared to initial volume) | |
|---|---|---|---|---|
| | Dry | Immersion | Dry | Immersion |
| 3% Agar | 12 MPa | 600 kPa | 30% | 25% |
| 3% gellan gum | 10 MPa | 500 kPa | 27% | 18% |

Figure 11:
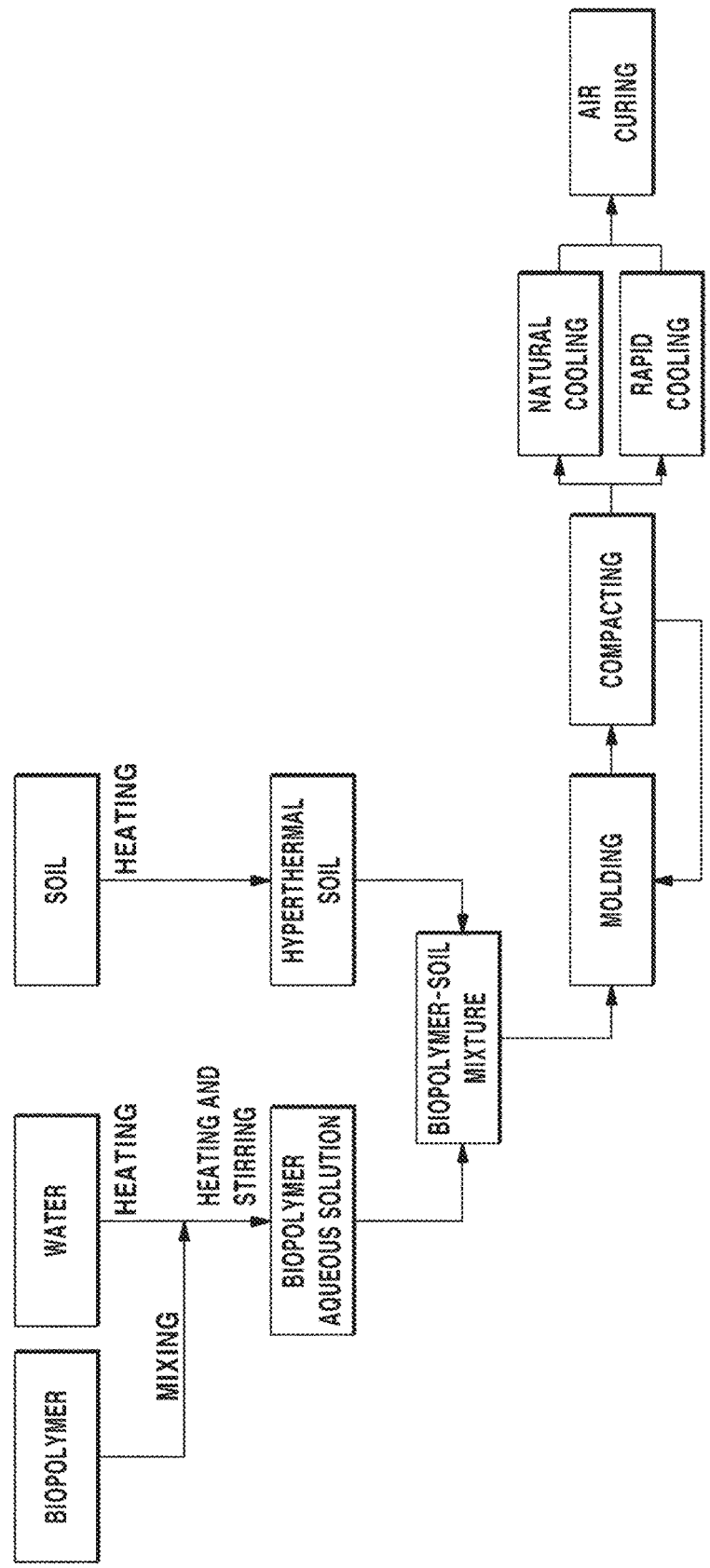
FIG. 11 shows a schematic diagram of a method of preparing an environment-friendly soil construction material by using a thermal gelled biopolymer in accordance with an example embodiment.

In this regard, FIG. 11 shows a conceptual diagram of method for preparing an environment-friendly soil construction material by using the thermal gelled biopolymer in accordance with an example embodiment. When soil construction materials (walls, panels, bricks or others) are manufactured by using the thermal gelled biopolymer through the method shown in FIG. 11, high-strength and high-durability construction materials can be realized. Since the thermal gelation exhibits low viscosity at a temperature of 80° C. or higher and forms highly viscous gel-matrices when the temperature decreases to 40° C. or less, it is important to maintain the high temperature until the process prior to the mixing and the molding. Accordingly, when a soil and the biopolymer aqueous solution are independently subject to heat treatment, and mixed with each other in the state of maintaining a certain temperature (e.g., 80° C.) or higher, and the formed biopolymer-soil-mixture is poured into a mold and cooled, various shapes fitting desired molds can be realized. After the mixture is poured into the mold, it is cooled to 40° C. or less and solidified; in this case, the mixture may be solidified through natural cooling in the air, or rapid cooling using water or other refrigerants. Since it was confirmed that the thermal gelled biopolymer in accordance with the present Example exhibited significantly low water permeability, and thus, its soil structure was not scattered even when it was immersed in water at the initial stage, these advantages can be utilized to prepare soil construction materials that can be molded in various shapes.

Figure 12:
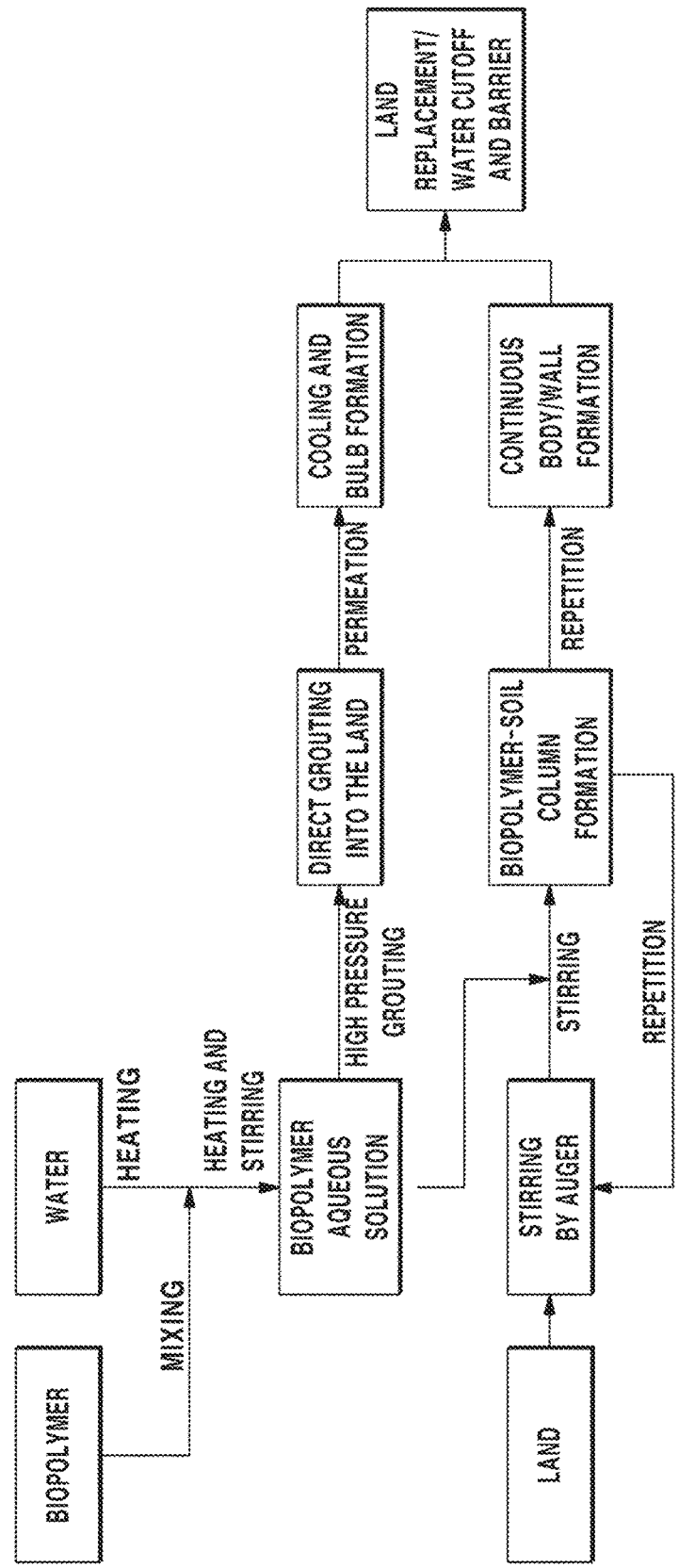
FIG. 12 shows a schematic diagram of a land treatment method using a thermal gelled biopolymer in accordance with an example embodiment.

It can be identified that the biopolymer-soil composition suggested by the example embodiments has significantly superior durability against water. Accordingly, the technology of the example embodiments can be applied in the form of grouting the hyperthermal biopolymer solution directly into the land or stirring the land for the water cutoff and barrier purposes or other enhancement reasons. FIG. 12 shows the specific performance method.

Example 6: Evaluation of Strength of the Biopolymer Mixture Soil Construction Material (Panel)

In order to evaluate the reasonableness of the use of the biopolymer-treated soil as a construction material, panel specimens having a 15 mm thickness were prepared by using yellow soil, which is the most widely used in the soil construction, and flexural strength of each of the panels was measured by the standard test method (KS F3504).

Figure 17:
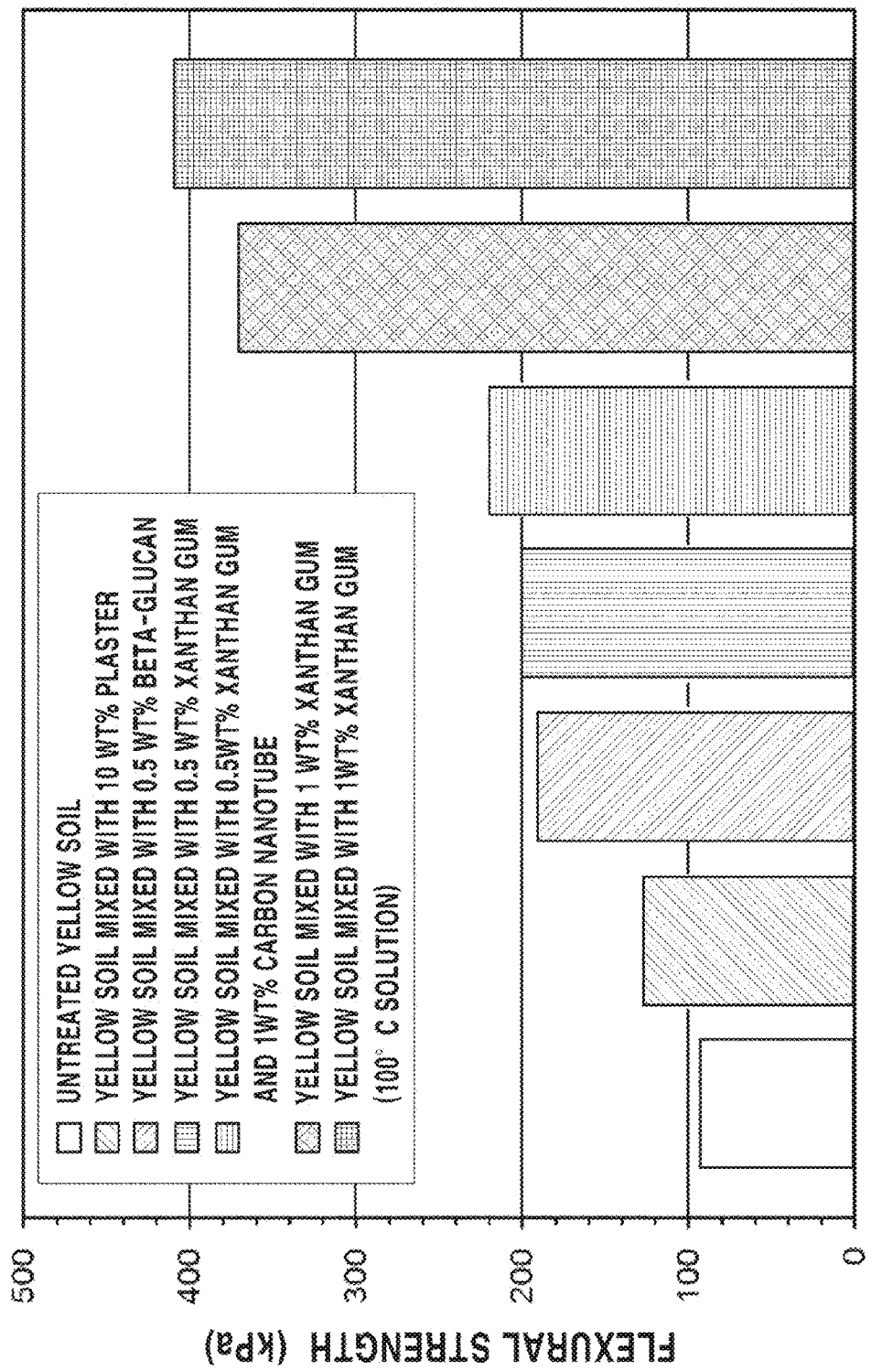
FIG. 17 is a graph showing flexural strength of a construction material using a biopolymer in accordance with an example embodiment.

For comparison, flexural strength of a soil having no additives, a soil mixed with 10% plaster, and a soil, to which 0.5% beta-glucan and 1.0% xanthan gum as a kind of the high-molecular viscous biopolymer were added, respectively, was measured. FIG. 17 provides the results.

As shown in FIG. 17, the flexural strength of the untreated soil in the dry state was less than 100 kPa, and the flexural strength in the condition of the soil mixed with 10% plaster also exhibited no significant increase; whereas the flexural strength of the specimen mixed with the high-molecular viscous biopolymer in accordance with the example embodiments significantly increased. Generally, it could be identified that the flexural strength was about 200 kPa when the biopolymer is included in 0.5% weight parts, and the flexural strength was closed to 400 kPa when the biopolymer is included in 1% weight part. On this basis, it is believed that the use of the high-molecular viscous biopolymer for soil construction and as a construction material can be a good alternative to overcome the problems of the low strength and the low durability of the conventional soil construction.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

What is claimed is:

1. A method for stabilizing and improving a soil, comprising:
adding a high-molecular viscous biopolymer into the soil; and
heating and cooling the soil.

2. The method of claim 1, wherein the high-molecular viscous biopolymer includes a polysaccharide-based biopolymer or an amino acid-based biopolymer.

3. The method of claim 2, wherein the polysaccharide-based biopolymer includes a high-molecular chain biopolymer or a gelled biopolymer.

4. The method of claim 1, wherein the high-molecular viscous biopolymer includes a member selected from the group consisting of beta glucan, alpha glucan, xanthan gum, gellan gum, wellan gum, agar gum, succinoglycan gum, curdlan, and combinations thereof, which include glucose as a monomer.

5. The method of claim 1, wherein the high-molecular viscous biopolymer includes a member selected from the group consisting of chitosan, γPGA, and a combination thereof.

6. The method of claim 1, wherein the high-molecular viscous biopolymer is added to the soil in 20 weight parts or less with respect to 100 weight parts of the soil.

7. The method of claim 1, wherein the adding high-molecular viscous biopolymer into the soil is performed by mixing the high-molecular viscous biopolymer with the soil, spraying the high-molecular viscous biopolymer on a surface of the soil, or injecting the high-molecular viscous biopolymer into the soil.

8. The method of claim 1, wherein the high-molecular viscous biopolymer in an aqueous solution or an alkaline aqueous solution thereof is added into the soil.

9. The method of claim 1, wherein the high-molecular viscous biopolymer in a powder form thereof is added into the soil.

10. The method of claim 1, further comprising adding an acidic aqueous solution or a cationic aqueous solution after adding the high-molecular viscous biopolymer into the soil.

11. The method of claim 1, further comprising adding a cation of an alkali metal or alkaline earth metal after the cooling.

12. The method of claim 7, further comprising spraying water, an acidic aqueous solution and/or a cationic aqueous solution after spraying the high-molecular viscous biopolymer on the surface of the soil.

* * * * *